US007780526B2

(12) United States Patent
Nguyen et al.

(10) Patent No.: US 7,780,526 B2
(45) Date of Patent: Aug. 24, 2010

(54) UNIVERSAL SYSTEM MEDIATION WITHIN GAMING ENVIRONMENTS

(75) Inventors: Binh T. Nguyen, Reno, NV (US); James W. Stockdale, Clio, CA (US)

(73) Assignee: IGT, Reno, NV (US)

( * ) Notice: Subject to any disclaimer, the term of this patent is extended or adjusted under 35 U.S.C. 154(b) by 1311 days.

(21) Appl. No.: 11/155,052

(22) Filed: Jun. 17, 2005

(65) Prior Publication Data

US 2005/0261058 A1 Nov. 24, 2005

Related U.S. Application Data

(63) Continuation-in-part of application No. 10/187,059, filed on Jun. 28, 2002, now Pat. No. 7,455,591, and a continuation-in-part of application No. 10/995,636, filed on Nov. 22, 2004.

(60) Provisional application No. 60/616,054, filed on Oct. 4, 2004.

(51) Int. Cl.

| | |
|---|---|
| ***A63F 9/24*** | (2006.01) |
| ***A63F 13/02*** | (2006.01) |
| ***A63F 13/10*** | (2006.01) |
| ***A63F 13/12*** | (2006.01) |
| ***G06Q 50/00*** | (2006.01) |
| *A63F 5/04* | (2006.01) |
| *G07F 17/34* | (2006.01) |

(52) U.S. Cl. .............................. 463/29; 463/40; 463/42

(58) Field of Classification Search ................... 463/25, 463/29, 40–42, 43, 46, 47; 380/251, 28–30, 380/54; 705/50, 51, 54, 59

See application file for complete search history.

(56) References Cited

U.S. PATENT DOCUMENTS 4,335,809 A 6/1982 Wain (Continued)

FOREIGN PATENT DOCUMENTS

CA 2445083 A1 9/2004

(Continued)

OTHER PUBLICATIONS

Office Action from EP Application No. 03 741 918.1—1525 dated Oct. 28, 2005, 6 pages.

(Continued)

*Primary Examiner*—Peter DungBa Vo
*Assistant Examiner*—Matthew D. Hoel
(74) *Attorney, Agent, or Firm*—Weaver Austin Villeneuve & Sampson LLP

(57) ABSTRACT

Gaming machines and networks capable of providing universal mediation between multiple disparate gaming systems are disclosed. In particular, multiple disparate gaming systems providing different services and features can be accessed by a player throughout a gaming session at a gaming device as a result of a single player transaction using a universal indicia of identification by the player. Such an indicia can include a card, token, PIN, biometric identifier and/or other identification source. A player identification device at the gaming device can accept such indicia, and can also facilitate protocol mediation and hardware mediation between the gaming device and each of the multiple disparate gaming systems. Enhanced DCUs may also be used to facilitate such mediations, and also to provide redundant communication paths between a LAN containing the gaming device and a WAN including the multiple disparate gaming systems.

19 Claims, 8 Drawing Sheets

U.S. PATENT DOCUMENTS

| | | | | |
|---|---|---|---|---|
| 4,372,558 | A * | 2/1983 | Shimamoto et al. | 463/41 |
| 4,856,787 | A | 8/1989 | Itkis | |
| 4,882,473 | A * | 11/1989 | Bergeron et al. | 463/25 |
| 4,998,199 | A * | 3/1991 | Tashiro et al. | 463/29 |
| 5,046,066 | A | 9/1991 | Messenger | |
| 5,242,163 | A | 9/1993 | Fulton | |
| 5,398,932 | A | 3/1995 | Eberhardt et al. | |
| 5,511,224 | A | 4/1996 | Tran et al. | |
| 5,586,257 | A * | 12/1996 | Perlman | 463/42 |
| 5,618,045 | A | 4/1997 | Kagan et al. | |
| 5,655,961 | A | 8/1997 | Acres et al. | |
| 5,682,476 | A | 10/1997 | Tapperson et al. | |
| 5,762,552 | A | 6/1998 | Vuong et al. | |
| 5,797,795 | A * | 8/1998 | Takemoto et al. | 463/42 |
| 5,810,664 | A * | 9/1998 | Clapper, Jr. | 463/17 |
| 5,830,067 | A * | 11/1998 | Graves et al. | 463/40 |
| 5,902,983 | A | 5/1999 | Crevelt et al. | |
| 5,999,808 | A | 12/1999 | LaDue | |
| 6,001,016 | A * | 12/1999 | Walker et al. | 463/42 |
| 6,135,887 | A | 10/2000 | Pease et al. | |
| 6,251,014 | B1 * | 6/2001 | Stockdale et al. | 463/16 |
| 6,264,561 | B1 | 7/2001 | Saffari et al. | |
| 6,270,410 | B1 * | 8/2001 | DeMar et al. | 463/20 |
| 6,319,125 | B1 * | 11/2001 | Acres | 463/25 |
| 6,330,021 | B1 | 12/2001 | Devaux | |
| 6,383,076 | B1 | 5/2002 | Tiedeken | |
| 6,402,614 | B1 | 6/2002 | Schneier et al. | |
| 6,409,602 | B1 | 6/2002 | Wiltshire et al. | |
| 6,488,580 | B1 | 12/2002 | Robb | |
| 6,595,853 | B1 * | 7/2003 | Osawa | 463/20 |
| 6,638,170 | B1 | 10/2003 | Crumby | |
| 6,645,077 | B2 | 11/2003 | Rowe | |
| 6,665,812 | B1 | 12/2003 | Blumenau et al. | |
| 6,682,423 | B2 | 1/2004 | Brosnan et al. | |
| 6,857,959 | B1 | 2/2005 | Nguyen | |
| 6,866,586 | B2 | 3/2005 | Oberberger et al. | |
| 6,884,174 | B2 | 4/2005 | Lundy et al. | |
| 6,893,347 | B1 | 5/2005 | Zilliacus et al. | |
| 7,294,056 | B2 | 11/2007 | Lowell et al. | |
| 2001/0039210 | A1 * | 11/2001 | St-Denis | 463/42 |
| 2002/0045477 | A1 | 4/2002 | Dabrowski | |
| 2002/0049909 | A1 | 4/2002 | Jackson et al. | |
| 2002/0071557 | A1 | 6/2002 | Nguyen | |
| 2002/0094869 | A1 * | 7/2002 | Harkham | 463/42 |
| 2002/0107072 | A1 * | 8/2002 | Giobbi | 463/42 |
| 2002/0116615 | A1 | 8/2002 | Nguyen et al. | |
| 2002/0147044 | A1 | 10/2002 | Jakobsson et al. | |
| 2003/0018927 | A1 | 1/2003 | Gadir et al. | |
| 2003/0032474 | A1 | 2/2003 | Kaminkow | |
| 2003/0182428 | A1 | 9/2003 | Li et al. | |
| 2003/0228898 | A1 | 12/2003 | Rowe | |
| 2003/0228912 | A1 | 12/2003 | Wells et al. | |
| 2004/0137978 | A1 * | 7/2004 | Cole et al. | 463/16 |
| 2004/0185931 | A1 | 9/2004 | Lowell et al. | |
| 2004/0242309 | A1 | 12/2004 | Melesko et al. | |
| 2005/0012818 | A1 | 1/2005 | Kiely et al. | |
| 2005/0181870 | A1 | 8/2005 | Nguyen et al. | |
| 2005/0202872 | A1 | 9/2005 | Niemela | |
| 2005/0261058 | A1 | 11/2005 | Nguyen et al. | |
| 2006/0025198 | A1 | 2/2006 | Gail et al. | |
| 2006/0111168 | A1 | 5/2006 | Nguyen et al. | |
| 2007/0060363 | A1 | 3/2007 | Nguyen et al. | |

FOREIGN PATENT DOCUMENTS

| | | | | |
|---|---|---|---|---|
| EP | 0 744 786 | A1 * | 11/1996 | |
| EP | 0744786 | | 11/1996 | |
| GB | 2 151 054 | | 7/1985 | |
| JP | 2001-345786 | | 12/2001 | |
| WO | 0199067 | A2 | 12/2001 | |
| WO | WO02/11345 | | 2/2002 | |
| WO | WO03/019486 | | 6/2003 | |
| WO | 2004095383 | A1 | 11/2004 | |

OTHER PUBLICATIONS

International Search Report and Written Opinion of International Application No. PCT/US05/28317, dated Sep. 29, 2006, 9 pages.

*Gaming System Overview*, 1.1 Overview, GS 300 Player Tracking Hardware-Installation and Troubleshooting, Apr. 15, 1999, pp. 1-7.

*Data Collection Unit (DCU)* 2.2.1 Smart 2 Systems Hardware, General Description and Installation, Feb. 7, 1997, 2-17-2-22.

PCT International Search Report, document entitled, "Redundant Gaming Network Mediation" International Publication No.: WO 004/004285, PCT/US2003/018356, 4 pages.

PCT International Preliminary Examination Report, document, Applicant's file reference No.: IGT1P056.WO, 3 pages.

U.S. Appl. No. 09/595,798, filed Jun. 16, 2000.

U.S. Appl. No. 09/618,365, filed Jul. 18, 2000.

U.S. Appl. No, 10/897,822, filed Jul. 22, 2004.

U.S. Appl. No. 10/923,568, filed Aug. 20, 2004.

International Search Report and Written Opinion from International Application No. PCT/US2006/021853, Dated Sep. 14, 2006, 10 pages.

International Search Report and Written Opinion from International Application No. PCT/US2005/033737, Dated Feb. 15, 2006, 10 pages.

Examination Report dated Aug. 10, 2007 from corresponding Australia Patent Application No. 2003280483, 2 pages.

Chinese Office Action dated Mar. 27, 2009 issued in 200580039992.8.

Mexican Office Action dated Sep. 8, 2009 issued in 07/03879.

US Office Action dated Mar. 24, 2006 issued in U.S. Appl. No. 10/187,059.

US Office Action dated Dec. 1, 2006 issued in U.S. Appl. No. 10/187,059.

US Office Action dated Apr. 16, 2007 issued in U.S. Appl. No. 10/187,059.

US Office Action dated Jul. 25, 2007 issued in U.S. Appl. No. 10/187,059.

US Notice of Allowance dated Mar. 12, 2008 issued in U.S. Appl. No. 10/187,059.

US Notice of Allowance dated Jul. 24, 2008 issued in U.S. Appl. No. 10/187,059.

Statement of Grounds and Particulars dated Jun. 7, 2009 issued in 2003280483.

US Office Action dated Jun. 23, 2008 issued in U.S. Appl. No. 10/995,636.

US Final Office Action dated Feb. 10, 2009 issued in U.S. Appl. No. 10/995,636.

US Office Action dated Jul. 16, 2009 issued in U.S. Appl. No. 10/995,636.

Chinese Office Action dated Nov. 6, 2009 issued in 200680021770.8.

* cited by examiner

UNIVERSAL SYSTEM MEDIATION WITHIN GAMING ENVIRONMENTS

CROSS-REFERENCE TO RELATED APPLICATIONS

The present application is a continuation-in-part of and claims priority from and commonly owned U.S. patent application Ser. No. 10/187,059 filed Jun. 28, 2002 now U.S. Pat. No. 7,455,591, entitled "REDUNDANT GAMING NETWORK MEDIATION," as well as co-pending and commonly owned U.S. Patent Application Nos. 60/616,054 filed Oct. 4, 2004 and 10/995,636 filed Nov. 22, 2004, both of which are entitled "CLASS II/CLASS III HYBRID GAMING MACHINE, SYSTEM AND METHODS," each of the foregoing of which is incorporated herein by reference in its entirety and for all purposes.

TECHNICAL FIELD

The present invention relates generally to gaming machines and systems, and more specifically to gaming system architectures and player identification techniques within or about electronic gaming machines and systems.

BACKGROUND

Casinos and other forms of gaming comprise a fast growing and evolving industry, particularly with respect to electronic and microprocessor based gaming machines and gaming machine related systems. In a typical gaming machine, such as a video poker, bingo, keno or slot machine, a game play is first initiated through a player wager of money, credit or other item of value, whereupon the gaming machine determines a game outcome, presents the game outcome to the player and then potentially dispenses an award of some type, including a monetary award, depending on the game outcome. Although this process is generally true for both mechanical and electronic gaming machines, electronic machines tend to be more popular with players and thus more lucrative for casinos for a number of reasons, such as increased game varieties, more attractive and dynamic presentations and the ability to award larger jackpots, among others. In addition, electronic gaming machines tend to be more readily adaptable to the various added features and systems that many casinos, riverboats, Indian reservations and other gaming operators now provide, such as, for example, player loyalty programs, harm minimization systems, advanced security systems, and paper tickets and other cashless instrument systems, among others.

There are generally a wide variety of associated devices that can be connected to an electronic gaming machine. Examples of these devices include lights, ticket printers, card readers, speakers, bill validators, ticket readers, coin acceptors, display panels, keypads, coin hoppers, button pads and the like. Many of these devices are built into the gaming machine or components associated with the gaming machine, such as a top box, which usually sits on top of the gaming machine. Typically, utilizing a master gaming controller ("MGC") or other like component having a central processing unit ("CPU"), an electronic gaming machine controls various combinations of devices that allow a player to play a game on the gaming machine, and also encourages game play on the gaming machine. For example, a game played on a gaming machine usually requires a player to input money or an indicia of credit into the gaming machine, indicate a wager amount, and initiate game play. These steps require the gaming machine to control input devices, such as bill validators and coin acceptors, to accept money into the gaming machine and recognize user inputs from devices, including key pads, button pads, card readers, and ticket readers, to determine the wager amount, and initiate game play. After game play has been initiated, the gaming machine determines a game outcome, presents the game outcome to the player and may dispense an award of some type depending on the outcome of the game. The operations described above may be carried out on the gaming machine when the gaming machine is operating as a "stand alone" unit or linked in a network of some type to a group of gaming machines.

As technology in the gaming industry progresses, more and more gaming services are being provided to electronic gaming machines via communication networks that link groups of gaming machines to a remote computer, such as a host server, that provides one or more gaming services. For example, gaming services that may be provided by a remote computer to a gaming machine via a communication network of some type include player tracking, accounting, cashless award ticketing, lottery, progressive games, and bonus games, among others. Typically, network gaming services enhance the game playing capabilities of the gaming machine or provide some operational advantage in regard to maintaining the gaming machine, such as better accounting or player tracking. Accordingly, network gaming services provided to groups of gaming machines linked over a dedicated communication network of some type have become very popular in the gaming industry.

In general, such dedicated communication networks are not accessible to the public. Due to the sensitive nature of much of the information on the dedicated networks, such as, for example, electronic fund transfer ("EFT") data and player tracking data, usually the manufacturer of a host system, such as a player tracking system, or group of host systems, employs a particular networking language having proprietary protocols. For instance, at least 10-20 different companies produce player tracking host systems where each host system may use different protocols. These proprietary protocols are usually considered highly confidential and are not released publicly. Thus, whenever a new host system is introduced for use with a gaming machine, rather than trying to interpret all the different protocols utilized by different manufacturers, the new host system is typically designed as a separate network. Consequently, as more host systems are introduced, the independent network structures continue to build up in the casino or other gaming establishment.

Further, in the gaming industry, gaming machines are generated by many different manufacturers. The communication protocols on each gaming machine are typically customized and hard-wired into the gaming machine, and each gaming machine manufacturer may utilize a different proprietary communication protocol. A given gaming machine manufacturer may also produce host systems for which their own gaming machines are compatible with their own host systems. However, in a heterogeneous gaming environment, such as a casino, gaming machines from many different manufacturers each with their own communication protocol or set of protocols may be connected to host systems from many different manufacturers, each with its own disparate communication protocol. Therefore, communication compatibility issues regarding the protocols used by the gaming machines in the system and protocols used by the host systems must be considered.

To justify the costs associated with the infrastructure needed to provide network gaming services on a dedicated communication network, a certain critical number of gaming machines linked in a network of some type must utilize the service. Thus, many of the networked gaming services are only provided at larger gaming establishments where a large number of gaming machines are deployed. A progressive game network offering progressive game services is one example where a group of gaming machines are linked together using a dedicated network to provide enhanced game playing service. The progressive game services enabled by the progressive game network increase the game playing capabilities of a particular gaming machine by enabling a larger jackpot than would be possible if the gaming machine was operating in a stand alone mode. The potential size of the jackpot increases as the number of gaming machines connected in the progressive network is increased. The size of the jackpot tends to increase game play on gaming machines offering a progressive jackpot, which then justifies the costs associated with installing and maintaining the dedicated progressive gaming network.

As earlier discussed, a particular gaming entity may also desire to provide network gaming services which provide some operational advantage. Thus, other dedicated networks may also connect the gaming machines to host servers that track the performance of gaming machines under the control of the entity, such as for player tracking systems, accounting management systems, EFT systems, marketing management, and cashless ticketing systems, such as the EZPay™ paper ticketing system developed and provided by IGT of Reno, Nev., among others. Another instance where disparate dedicated networks for gaming machines are used within a single casino or gaming establishment can include the provision of different classes of gaming machines, such as Class II and Class III gaming machines, within that single casino or gaming establishment.

Most wager type games can generally be divided into Class I, Class II and Class III type games. Class I gaming includes social games played for minimal prizes and traditional ceremonial games, and these types of games typically do not appear on gaming machines or other sophisticated gaming systems. Class II gaming generally involve those games where the game outcomes are centrally determined, such as by a central server, machine, ball hopper or other such device. Examples of such Class II games include keno, bingo and bingo-like games, as well as lottery and other pulltab games, among others. While Class II games tend to be known as games that are played manually with a central draw, such games can be played electronically as well. Electronic Class II games, such as keno, bingo and pulltab games, may be played on a networked gaming machine having a central processor, for example.

Bingo is a typical Class II game that can include games played for prizes, including monetary prizes, with cards bearing numbers or other designations in which the holder of the cards covers such numbers or designations when objects, similarly numbered or designated, are drawn or electronically determined, and in which the game is won by the first person covering a previously designated arrangement of numbers or designations on such cards. Such an arrangement will sometimes be referred to herein as a "game-winning pattern" or a "game-ending pattern." Two basic forms of bingo exist. In traditional bingo, the players purchase cards after which a draw takes place. The first player to achieve a designated pattern wins. In one type of bingo game known as Bonanza Bingo, the draw for the game takes place before the players know the arrangements on their bingo cards. After the draw occurs, the players may purchase cards and compare the arrangements on the cards to the drawn numbers to determine whether predetermined patterns are matched. Play continues in Bonanza Bingo until at least one of the players matches a designated game-winning pattern. Bonanza Bingo may also encompass bingo variations wherein a partial draw is conducted for some numbers (generally fewer than the number of balls expected to be necessary to win the game) prior to selling the bingo cards. After the bingo cards are sold, additional numbers are drawn until there is a winner.

Class II gaming may also include pulltab games, particularly if played in the same location as bingo games, lotto, punch boards, tip jars, instant bingo, and other games similar to bingo and keno. A traditional pulltab game includes scratch-off and peel-off types of gaming involving a card that has an outcome printed on it. The game consists in displaying the outcome. A pulltab game has a finite number of outcomes (a "pool"), all at the same price, predetermined to attain an established payout (e.g., 3 $1000 winners, 5 $500 winners and 10 $100 winners). The game outcomes are typically fixed in that they have all been determined by a central authority and do not depend on any action by and local to the players, other than perhaps noting and interpreting the correct items or numbers called in a manual game, such as bingo, keno and the like. Pulltab games are, in principle, similar to lottery games. Therefore, as used herein, the terms "pulltab," "pulltab game," etc., will include lottery games.

Class III gaming generally includes most any other game that is not a Class I or Class II game, such as games of chance typically offered in non-Indian, state-regulated casinos. In particular, Class III games are those that have their game outcomes determined locally, such as at a processor or device where the player is located. Typically, Class III gaming machines are those where the gaming machine has its own random number generator to determine its own game outcomes locally, as opposed to Class II electronic gaming machines, where the game outcomes are typically determined remotely by a central server. Although Class III gaming machines have proven to be very popular, Class III gaming machines in particular may be subject to stricter approvals and regulations, due to the increased complexities involved in local game outcome determinations, as well as increased possibilities for tampering and fraud. Many gaming establishments that have both Class II and Class III gaming machines tend to have a limited number of gaming machines for playing Class III games and a greater number of gaming machines for playing Class II games, such as bingo. All will be readily appreciated, typical examples of Class III gaming machines include most forms of slot machines and video poker machines.

Where a single casino or other gaming establishment has both Class II and Class III gaming machines, it is common to have one class of gaming machines in one area and the other class of gaming machines in a different area. Also, the Class II gaming machines can be networked to a Class II game server and to a Class II player tracking server, while the Class III gaming machines can be networked to a Class III game server and to a Class III player tracking server. Each of these servers is usually separate and runs a separate system, and the servers do not share information amongst each other. Because Class III gaming machines tend to be more popular with players, and because there tends to be a limited number of Class III games for a particular gaming establishment, this often causes lines of people to form, all waiting to play Class III games on a Class III gaming machine. In some instances, there are Class II gaming machines available for play, but some players choose to wait in line for a Class III gaming machine rather than play a Class II gaming machine. Having players wait in line serves neither the interests of the players themselves nor the interests of those who own or operate the gaming establishment: while players wait in line, they are not being entertained and are not generating revenue.

Considering the foregoing, it is desirable to provide gaming systems and methods wherein players do not need to wait in line for a Class III game to become available to them. Preferably, such gaming systems and methods would allow the players to play Class II games until a Class III game becomes available. Where such systems and methods might provide players with the ability to access both Class II and Class III games at a single gaming machine or location though, other problems and inconveniences may still arise. For example, a player may be required to log into one or more systems at a gaming location for playing Class II games, and then log on one or more times again when he or she wants to switch over to play Class III games at that same machine or location, since the systems that serve these different types of games tend to be entirely disparate and unable to communicate between each other. As far as the player is concerned, any such requirement of multiple logins or sign-ons to access different features or services is an inconvenience that might not be worth the extra hassle where such features or services are optional. Where such extra features are required, a disincentive to play altogether can arise.

In many casinos and other gaming environments, multiple disconnected disparate systems require information regarding some form of identification of a player currently playing a gaming machine. The primary player identification form typically used in a casino environment today is a plastic card with a magnetic stripe that contains a player identification number and/or other player identifying indicia. Typical card reader mechanisms read data on the magnetic stripe of the card, which data is validated for correctness and then transmitted via an electrical interface to a controlling computer device via one of several electrical interfaces, including discrete clock and data signals, RS232, universal serial bus ("USB"), and the like. Such controlling computer devices tend to be servers or other centrally located devices apart from the actual gaming machines where player cards are inserted. Often it is difficult and in some cases impossible to share data, such as the player identification information, amongst these systems at the "back end" of one or more such systems.

Examples of the various disparate systems that a player might be required to access or wish to access to play gaming machines at a given gaming location or establishment can include many of those noted above and others, such as, for example, player identification or verification systems, location verification systems, account based or storage card based gaming systems, player loyalty programs, harm minimization systems, progressive jackpot systems, advanced security systems, EFT systems, various accounting and tax based systems, entertainment and other communication systems, and paper ticket and other cashless instrument systems, as well as any base Class II or Class III gaming networks, among others.

As one specific example of a system or network within a casino or other gaming environment that requires player access, each player might be required to carry a player debit or storage card in order to play any gaming machines at all in some gaming jurisdictions or at some gaming establishments. A specific amount of money or credit can be deposited and credited to a player account in advance, such as during a check in process, after which the player is then provided with a storage card linked to that deposit and/or credit amount. This storage or debit card must then be used at all gaming machines in that gaming establishment in order to play. Where used, such player storage or debit cards are typically granted on a per day or session basis. Such storage cards are typically used in association with a distinct player accounting system that is in communication with the electronic gaming machines in the gaming establishment, with such a player accounting system being disparate from any other system also associated with those gaming machines.

In addition, players may wish to use player tracking cards that associated with player loyalty programs. As is known in the art, such programs generally award players with player tracking points corresponding to the amount of play or money or credit wagered by a player during gaming activities. These player tracking points or credits can be accumulated and then be redeemed for prizes, merchandise, upgrades, meals and many other forms of "comps," as determined and provided by each given program administrator. In order to get credit or "points" under such programs for playing at gaming machines though, it is usually required that a player provide his or her player tracking card at the gaming machine during a gaming session, such as by inserting the player tracking card into a player tracking device at the gaming machine and keeping the card in that device throughout the gaming session. Unfortunately, any desire to participate in a player loyalty program at a gaming establishment that is run by implementing data or storage cards as described above would result in players needing to provide two different player cards or "logins" in order to play at those gaming machines and receive player tracking points for doing so, since any general accounting system would be disparate from any player tracking and rewards system.

Because various player tracking programs at different establishments are usually administered by different entities, many players typically have multiple player tracking cards for multiple different player loyalty programs. One example of such a need for multiple player tracking cards arises within the context of providing player loyalty points for Class II and Class III gaming, since the differing requirements, payout schedules, tax implications and general natures of these different classes of gaming tends to result in different player loyalty systems being provided for different classes of games. That is, there are presently no known universal player loyalty programs that award player points for gaming at both Class II and Class III gaming machines within the same system. Hence, where one gaming establishment offers both Class II and Class III gaming machines, any desire to provide player loyalty points for both classes of games would necessarily result in a player needing to provide one player tracking card for the Class II games and a separate player tracking card under another system for the Class III games. In such situations, a player moving from a dedicated Class II gaming machine to a dedicated Class III gaming machine would need to "log on" again with 2 separate cards in order to play and earn player loyalty points. Even in instances where a player might be able to play Class II games and Class III games at a single location, any switch from one system to the other would at least involve a required submission of a different player tracking card.

As yet another example, many gaming jurisdictions now require that some form of harm minimization be implemented. Examples of such implementations can include the use of player identifiers at gaming machines and other gaming locations, such that a given player is not permitted to play beyond an extended time period and/or lose a monetary or credit amount beyond a certain level for any given day or gaming session. Again, such systems can be implemented through the use of player cards or other similar player identifiers, whereby such cards must be inserted into a device at the gaming machine or other gaming location before play is permitted. Thus, the gaming of individual players can be tracked for specific localized harm minimization purposes, whereby a shut down or cutoff for that player is effected after certain time periods or loss limits have been reached. As in the foregoing examples, however, such systems are again typically disparate from other systems or networks in a gaming environment, such that a player within such a jurisdiction might be required to provide yet another "harm minimization" card or form of player identification in order to play at the gaming machines within that jurisdiction.

Similar effects might be seen with respect to other features and services that might be provided to or required of players, with players being required to submit separate identifiers for each such additional system that would be involved for these added features or services. Again, further examples can include player identification or verification systems, location verification systems, progressive jackpot systems, advanced security systems, EFT systems, various accounting and tax based systems, entertainment and other communication systems, and paper ticket and other cashless instrument systems, among others. While some of these disparate systems might provide features or services that are optional, such that a given player could decline to participate, others might be required depending upon the gaming operator or jurisdiction. As the further accumulation of many disparate systems within a gaming environment requires further identifications or submissions from players, many players will become inconvenienced and eventually turned off by such requirements, possibly to the point of no longer desiring to play games at all.

While existing ways of providing various features and services to players and gaming operators with respect to electronic gaming machines and systems have been adequate, improvements are usually welcomed and encouraged. In light of the foregoing, it is thus desirable to provide systems and methods whereby players can access the various features and services available at electronic gaming machines through disparate systems and networks without requiring the players to provide multiple cards or other logins in order to do so.

SUMMARY

It is an advantage of the present invention to provide improved systems and methods for universal system mediation within gaming environments. This is accomplished in many embodiments by providing within or about a gaming machine or gaming system at least one device adapted to accept one universal identifying card or other indicia from a player and then use that card or other indicia to identify the player to multiple disparate systems associated with the gaming machine or system. Such devices can include a "smart" card accepting and reading device at the gaming machine and/or at least one enhanced data collection unit ("DCU") connected to multiple gaming machines and adapted to facilitate communications between such gaming machines and a plurality of disparate systems, as will be readily appreciated.

According to various embodiments of the present invention, the disclosed systems and methods can involve a gaming machine adapted for accepting a wager, playing a game based on the wager and granting a payout based on the result of the game. This gaming machine can include an exterior housing arranged to contain a plurality of internal gaming machine components, an MGC adapted to control one or more game aspects, at least one link adapted to connect the gaming machine to a plurality of disparate systems or at least a gateway thereto, and a player identification device, further details of which are provided below. In addition to controlling various game aspects, the MGC can also be in communication with and control one or more aspects of the various internal components within the gaming machine.

According to one embodiment, an enhanced DCU that provides redundant gaming network communication and protocol mediation services between gaming machines and associated servers on a gaming communication network is provided. One aspect of the invention provides an enhanced DCU that provides at least one redundant transmission path to the host server. The apparatus may be generally characterized as including: a first, primary transmission path between the gaming machines on the gaming communication network and a host server; and at least a second, redundant transmission path between the gaming machines on the gaming communication network and the host server.

The present invention may involve a gaming communication network having redundant network connections between a plurality of gaming machines and a host server. The gaming communication network may be generally characterized as including: an enhanced DCU for providing redundant network communication between a plurality of gaming machines and the host server over a network; a plurality of gaming machines, the plurality of gaming machines in communication with an enhanced DCU; a host server, the host server in communication with the enhanced DCU; and a network, the network allowing communication between the host server and the plurality of gaming machines via the enhanced DCU.

Another aspect of the present invention provides an apparatus for providing redundant network mediation between gaming machines and a host server on a gaming communication network. The apparatus may be generally characterized as including: means for receiving data from gaming machines on a gaming communication network over at least one network connection; means for converting the data into a designated file format suitable for acceptance by a host server on the gaming communication network; means for transmitting the formatted data over a first, primary transmission path to the host server; and means for transmitting the formatted data over a second, redundant transmission path.

Another aspect of the present invention provides, in an enhanced DCU, a method for providing network mediation on a gaming communication network with a plurality of gaming machines, one or more host servers and a plurality of transmission paths between the gaming machines and the one or more host servers, including: monitoring communications between a plurality of gaming machines and one or more host servers; mirroring gaming information stored on the one or more host servers on the enhanced DCU; detecting a first, primary transmission path has been lost between the gaming machines and the one or more host servers; and switching communications to a second transmission path.

In some embodiments, the method may further include: detecting the second transmission path has been lost, and then receiving a gaming information request directed to a first host server from a first gaming machine; and sending a reply message with the requested gaming information to the first gaming machine using mirrored gaming information from the first host server stored on the enhanced DCU. In some embodiments, the method may include: receiving a message with gaming information directed to a first host server from a first gaming machine; and storing the gaming information to a memory device. Upon detecting a transmission path between the enhanced DCU and the first host server is available, the stored gaming information may then be transmitted to the first host server.

According to various embodiments of the present invention, the disclosed apparatuses, systems and methods can include a gaming machine or system having a player identification device in communication with an MGC and configured to accept a universal indicia of identification from a player. The player identification device or other suitable component can facilitate the ability of a player to log in to each of a plurality of disparate gaming systems for a gaming session at the gaming machine through a single use of his or her universal indicia of identification. Such an indicia of identification can be assigned to the player by a casino, gaming operator or other entity, and can include a credit card, a debit card, a smart card, a magnetic striped card, a printed ticket, a room key, a keychain, a bracelet, a wristwatch, a lucky token, a portable wireless device, an RFID tag, a bar code, a thermal print, an infrared ink print, an electronic ink print, a PIN code, a fingerprint, a retinal scan, a voiceprint and a digitized personal signature, among other possible items.

Further embodiments of the present invention can include a link from the gaming machine to a plurality of disparate gaming systems or networks, where such a link can include access through a gateway or plurality of redundant gateways. Such a gateway or plurality of gateways can include one or more enhanced DCUs, as set forth above. In one arrangement, a plurality of gaming machines, gateways and/or other networked devices can form a local area network ("LAN"), which is adapted to communicate via the gateway or gateways with a wide area network ("WAN") that includes servers for the plurality of disparate gaming systems or networks.

In one or more of the foregoing embodiments, the player identification device or other suitable component can also be adapted to facilitate or provide various forms of service mediation, which can include protocol mediation, hardware mediation, eligibility mediation or any combination thereof. Protocol mediation can be made between a gaming machine or LAN and the software of each of a plurality of disparate gaming systems associated with the gaming machine or LAN. Hardware mediation can be made between the gaming machine or LAN and the hardware of each of the plurality of disparate gaming systems. Eligibility mediation can be made with respect to a player, gaming machine, LAN or any combination thereof being eligible to receive one or more games, services or presentations from one or more of the plurality of disparate gaming systems.

Further embodiments can include the ability of players to elect a desire to use at last one of the plurality of disparate gaming systems or networks, as well as to participate in at least one such disparate system or network anonymously. Such an election by a player may involve an election of a subset of services or disparate gaming systems or servers, with such a subset being less than all of the services or disparate gaming systems or servers that may be available to the player. Other formations of such a subset can be due to the physical location of the player, gaming machine or device, or LAN and the legal jurisdiction resulting therefrom, as well as one or more other particular eligibility factors of the player.

Other methods, features and advantages of the invention will be or will become apparent to one with skill in the art upon examination of the following figures and detailed description. It is intended that all such additional methods, features and advantages be included within this description, be within the scope of the invention, and be protected by the accompanying claims.

BRIEF DESCRIPTION OF THE DRAWINGS

The included drawings are for illustrative purposes and serve only to provide examples of possible structures and process steps for the disclosed inventive systems and methods for providing universal system mediation within a gaming environment. These drawings in no way limit any changes in form and detail that may be made to the invention by one skilled in the art without departing from the spirit and scope of the invention.

DETAILED DESCRIPTION

Figure 1:
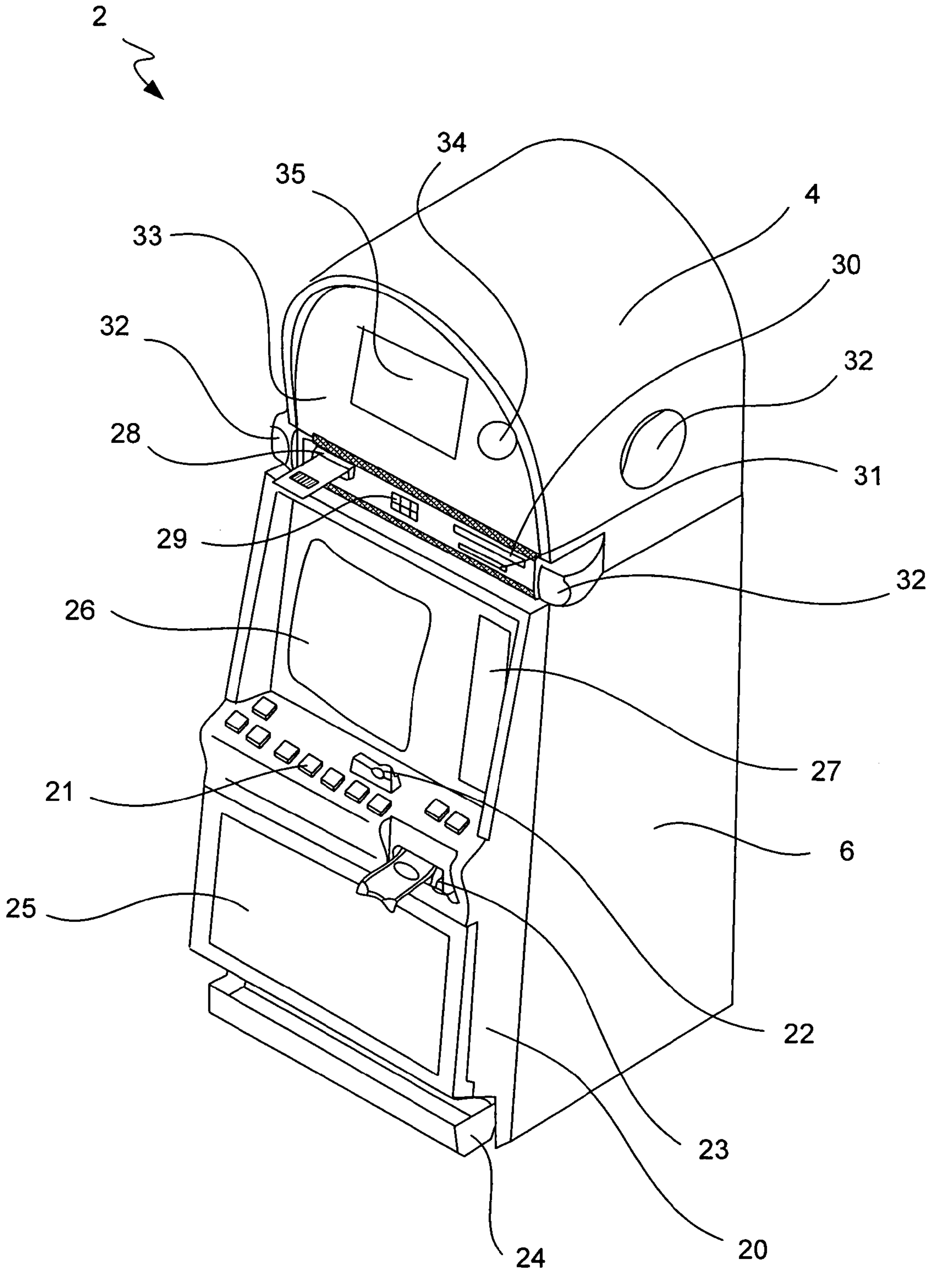
FIG. 1 illustrates in perspective view an exemplary gaming machine.

Exemplary applications of systems and methods according to the present invention are described in this section. These examples are being provided solely to add context and aid in the understanding of the invention. It will thus be apparent to one skilled in the art that the present invention may be practiced without some or all of these specific details. In other instances, well known process steps have not been described in detail in order to avoid unnecessarily obscuring the present invention. Other applications are possible, such that the following example should not be taken as definitive or limiting either in scope or setting. In the detailed description that follows, references are made to the accompanying drawings, which form a part of the description and in which are shown, by way of illustration, specific embodiments of the present invention. Although these embodiments are described in sufficient detail to enable one skilled in the art to practice the invention, it is understood that these examples are not limiting, such that other embodiments may be used and changes may be made without departing from the spirit and scope of the invention.

One advantage of the present invention is the provision of universal system mediation between disparate systems within a gaming environment. This can be accomplished by providing both protocol mediation between disparate software systems and hardware mediation between the differing hardware components that can be included in such disparate systems. Preferably, such mediations can be accounted for at the various gaming machines or related gateways between the gaming machines and a wide area network including the various disparate systems. By providing such mediation at the front end of an overall wide area network or set of networks, many difficulties associated with back end mediation between disparate systems can be reduced or avoided altogether.

Another advantage of the disclosed apparatuses, systems and methods is the ability to permit players to avail themselves of the various features and services provided by multiple disparate systems and networks without requiring the players to log into or otherwise authenticate themselves to each separate system or network. This can be accomplished through the use of a universal indicia of identification, such as a single magnetic stripe card or other device assigned to a player. This card or other device can then be used once by the player upon checking in at a gaming machine or other gaming device, whereupon some or all services and features from some or all disparate gaming networks are made available to the player. By providing such a function, players are exposed only to one check in or login procedure for all features and services, whereby the appearance of such a seamless integration from the perspective of the player creates a more player friendly gaming environment and encourages additional play and future returns for players.

Although the present invention is directed primarily to gaming machines and systems, it is worth noting that some of the apparatuses, systems and methods disclosed herein might be adaptable for use in other types of devices or environments, such that their use is not restricted exclusively to gaming machines and contexts. Such other adaptations may become readily apparent upon review of the inventive devices, systems and methods illustrated and discussed herein. The remainder of the detailed description herein first provides general discussions of gaming machines and then of general gaming systems. Next, embodiments of specific specialized gaming systems adapted to provide hardware mediation, software mediation, and redundant communications are disclosed. Finally, specifics for using these gaming systems to provide single login abilities for players are given, including an exemplary method for permitting a player to login once for all systems at a gaming device.

Gaming Machines

Referring first to FIG. 1, an exemplary gaming machine is illustrated in perspective view. Gaming machine 2 includes a top box 4 and a main cabinet 6, which generally surrounds the machine interior (not shown) and is viewable by users. This top box and/or main cabinet can together or separately form an exterior housing adapted to contain a plurality of internal gaming machine components therein. Main cabinet 6 includes a main door 20 on the front of the gaming machine, which preferably opens to provide access to the gaming machine interior. Attached to the main door are typically one or more player-input switches or buttons 21, one or more money or credit acceptors, such as a coin acceptor 22 and a bill or ticket validator 23, a coin tray 24, and a belly glass 25. Viewable through main door 20 is a primary video display monitor 26 and one or more information panels 27. The primary video display monitor 26 will typically be a cathode ray tube, high resolution flat-panel LCD, plasma/LED display or other conventional or other type of appropriate video monitor. Alternatively, a plurality of gaming reels can be used as a primary gaming machine display in place of display monitor 26, with such gaming reels preferably being electronically controlled, as will be readily appreciated by one skilled in the art.

Top box 4, which typically rests atop of the main cabinet 6, may contain a ticket printer 28, a key pad 29, one or more additional displays 30, a card reader 31, one or more speakers 32, a top glass 33, one or more cameras 34, and a secondary video display monitor 35, which can similarly be a cathode ray tube, a high resolution flat-panel LCD, a plasma/LED display or any other conventional or other type of appropriate video monitor. Alternatively, secondary display monitor 35 might also be foregone in place of other displays, such as gaming reels or physical dioramas that might include other moving components, such as, for example, one or more movable dice, a spinning wheel or a rotating display. It will be understood that many makes, models, types and varieties of gaming machines exist, that not every such gaming machine will include all or any of the foregoing items, and that many gaming machines will include other items not described above.

With respect to the basic gaming abilities provided, it will be readily understood that gaming machine 2 can be adapted for presenting and playing any of a number of gaming events, particularly games of chance involving a player wager and potential monetary payout, such as, for example, a wager on a sporting event or general play as a slot machine game, a keno game, a video poker game, a video blackjack game, and/or any other video table game, among others. While gaming machine 2 can typically be adapted for live game play with a physically present player, it is also contemplated that such a gaming machine may also be adapted for game play with a player at a remote gaming terminal. Other features and functions may also be used in association with gaming machine 2, and it is specifically contemplated that the present invention can be used in conjunction with such a gaming machine or device that might encompass any or all such additional types of features and functions. Gaming machines such as these and other variations and types are made by many manufacturers, such as, for example, IGT of Reno, Nev.

With respect to electronic gaming machines in particular, the electronic gaming machines made by IGT are provided with special features and additional circuitry that differentiate them from general-purpose computers, such as a laptop or desktop personal computer ("PC"). Because gaming machines are highly regulated to ensure fairness, and in many cases are operable to dispense monetary awards of millions of dollars, hardware and software architectures that differ significantly from those of general-purpose computers may be implemented into a typical electronic gaming machine in order to satisfy security concerns and the many strict regulatory requirements that apply to a gaming environment. A general description of many such specializations in electronic gaming machines relative to general-purpose computing machines and specific examples of the additional or different components and features found in such electronic gaming machines will now be provided.

At first glance, one might think that adapting PC technologies to the gaming industry would be a simple proposition, since both PCs and gaming machines employ microprocessors that control a variety of devices. However, because of such reasons as 1) the regulatory requirements that are placed upon gaming machines, 2) the harsh environment in which gaming machines operate, 3) security requirements and 4) fault tolerance requirements, adapting PC technologies to a gaming machine can be quite difficult. Further, techniques and methods for solving a problem in the PC industry, such as device compatibility and connectivity issues, might not be adequate in the gaming environment. For instance, a fault or a weakness tolerated in a PC, such as security holes in software or frequent crashes, may not be tolerated in a gaming machine because in a gaming machine these faults can lead to a direct loss of funds from the gaming machine, such as stolen cash or loss of revenue when the gaming machine is not operating properly.

Accordingly, one difference between gaming machines and common PC based computers or systems is that gaming machines are designed to be state-based systems. In a state-based system, the system stores and maintains its current state in a non-volatile memory, such that in the event of a power failure or other malfunction the gaming machine will return to its current state when the power is restored. For instance, if a player were shown an award for a game of chance and the power failed before the award was provided, the gaming machine, upon the restoration of power, would return to the state where the award was indicated. As anyone who has used a PC knows, PCs are not state machines, and a majority of data is usually lost when a malfunction occurs. This basic requirement affects the software and hardware design of a gaming machine in many ways.

A second important difference between gaming machines and common PC based computer systems is that for regulation purposes, the software on the gaming machine used to generate the game of chance and operate the gaming machine must be designed as static and monolithic to prevent cheating by the operator of gaming machine. For instance, one solution that has been employed in the gaming industry to prevent cheating and satisfy regulatory requirements has been to manufacture a gaming machine that can use a proprietary processor running instructions to generate the game of chance from an EPROM or other form of non-volatile memory. The coding instructions on the EPROM are static (non-changeable) and must be approved by a gaming regulator in a particular jurisdiction and installed in the presence of a person representing the gaming jurisdiction. Any change to any part of the software required to generate the game of chance, such as, for example, adding a new device driver used by the master gaming controller to operate a device during generation of the game of chance, can require a new EPROM to be burnt, approved by the gaming jurisdiction, and reinstalled on the gaming machine in the presence of a gaming regulator. Regardless of whether the EPROM solution is used, to gain approval in most gaming jurisdictions, a gaming machine must demonstrate sufficient safeguards that prevent an operator of the gaming machine from manipulating hardware and software in a manner that gives the operator an unfair or even illegal advantage over a player. The code validation requirements in the gaming industry affect both hardware and software designs on gaming machines.

A third important difference between gaming machines and common PC based computer systems is that the number and kinds of peripheral devices used on a gaming machine are not as great as on PC based computer systems. Traditionally in the gaming industry, gaming machines have been relatively simple in the sense that the number of peripheral devices and the number of functions on the gaming machine have been limited. Further, the functionality of a gaming machine tends to remain relatively constant once the gaming machine is deployed, in that new peripheral devices and new gaming software is infrequently added to an existing operational gaming machine. This differs from a PC, where users tend to buy new and different combinations of devices and software from different manufacturers, and then connect or install these new items to a PC to suit their individual needs. Therefore, the types of devices connected to a PC may vary greatly from user to user depending on their individual requirements, and may also vary significantly over time for a given PC.

Although the variety of devices available for a PC may be greater than on a gaming machine, gaming machines still have unique device requirements that differ from a PC, such as device security requirements not usually addressed by PCs. For instance, monetary devices such as coin dispensers, bill validators, ticket printers and computing devices that are used to govern the input and output of cash to a gaming machine have security requirements that are not typically addressed in PCs. Many PC techniques and methods developed to facilitate device connectivity and device compatibility do not address the emphasis placed on security in the gaming industry. To address some of these issues, a number of hardware/software components and architectures are utilized in gaming machines that are not typically found in general purpose computing devices, such as PCs. These hardware/software components and architectures include, but are not limited to, items such as watchdog timers, voltage monitoring systems, state-based software architectures and supporting hardware, specialized communication interfaces, security monitoring, and trusted memory.

A watchdog timer is normally used in IGT gaming machines to provide a software failure detection mechanism. In a normal operating system, the operating software periodically accesses control registers in a watchdog timer subsystem to "re-trigger" the watchdog. Should the operating software not access the control registers within a preset timeframe, the watchdog timer will time out and generate a system reset. Typical watchdog timer circuits contain a loadable timeout counter register to allow the operating software to set the timeout interval within a certain time range. A differentiating feature of some preferred circuits is that the operating software cannot completely disable the function of the watchdog timer. In other words, the watchdog timer always functions from the time power is applied to the board.

IGT gaming computer platforms preferably use several power supply voltages to operate portions of the computer circuitry. These can be generated in a central power supply or locally on the computer board. If any of these voltages falls out of the tolerance limits of the circuitry they power, unpredictable operation of the computer may result. Though most modern general-purpose computers include voltage monitoring circuitry, these types of circuits only report voltage status to the operating software. Out of tolerance voltages can cause software malfunction, creating a potential uncontrolled condition in the gaming computer. IGT gaming machines, however, typically have power supplies with tighter voltage margins than that required by the operating circuitry. In addition, the voltage monitoring circuitry implemented in IGT gaming computers typically has two thresholds of control. The first threshold generates a software event that can be detected by the operating software and an error condition generated. This threshold is triggered when a power supply voltage falls out of the tolerance range of the power supply, but is still within the operating range of the circuitry. The second threshold is set when a power supply voltage falls out of the operating tolerance of the circuitry. In this case, the circuitry generates a reset, halting operation of the computer.

The standard method of operation for IGT gaming machine game software is to use a state machine. Each function of the game (e.g., bet, play, result) is defined as a state. When a game moves from one state to another, critical data regarding the game software is stored in a custom non-volatile memory subsystem. In addition, game history information regarding previous games played, amounts wagered, and so forth also should be stored in a non-volatile memory device. This feature allows the game to recover operation to the current state of play in the event of a malfunction, loss of power, or the like. This is critical to ensure that correct wagers and credits are preserved. Typically, battery backed RAM devices are used to preserve this critical data. These memory devices are not used in typical general-purpose computers. Further, IGT gaming computers normally contain additional interfaces, including serial interfaces, to connect to specific subsystems internal and external to the gaming machine. The serial devices may have electrical interface requirements that differ from the "standard" EIA RS232 serial interfaces provided by general-purpose computers. These interfaces may include EIA RS485, EIA RS422, Fiber Optic Serial, optically coupled serial interfaces, current loop style serial interfaces, and the like. In addition, to conserve serial interfaces internally in the gaming machine, serial devices may be connected in a shared, daisy-chain fashion where multiple peripheral devices are connected to a single serial channel.

IGT gaming machines may alternatively be treated as peripheral devices to a casino communication controller and connected in a shared daisy chain fashion to a single serial interface. In both cases, the peripheral devices are preferably assigned device addresses. If so, the serial controller circuitry must implement a method to generate or detect unique device addresses. General-purpose computer serial ports are not able to do this. In addition, security monitoring circuits detect intrusion into an IGT gaming machine by monitoring security switches attached to access doors in the gaming machine cabinet. Preferably, access violations result in suspension of game play and can trigger additional security operations to preserve the current state of game play. These circuits also function when power is off by use of a battery backup. In power-off operation, these circuits continue to monitor the access doors of the gaming machine. When power is restored, the gaming machine can determine whether any security violations occurred while power was off, such as by software for reading status registers. This can trigger event log entries and further data authentication operations by the gaming machine software.

Trusted memory devices are preferably included in an IGT gaming machine computer to ensure the authenticity of the software that may be stored on less secure memory subsystems, such as mass storage devices. Trusted memory devices and controlling circuitry are typically designed to not allow modification of the code and data stored in the memory device while the memory device is installed in the gaming machine. The code and data stored in these devices may include, for example, authentication algorithms, random number generators, authentication keys, operating system kernels, and so forth. The purpose of these trusted memory devices is to provide gaming regulatory authorities a root trusted authority within the computing environment of the gaming machine that can be tracked and verified as original. This may be accomplished via removal of the trusted memory device from the gaming machine computer and verification of the secure memory device contents is a separate third party verification device. Once the trusted memory device is verified as authentic, and based on the approval of verification algorithms contained in the trusted device, the gaming machine is allowed to verify the authenticity of additional code and data that may be located in the gaming computer assembly, such as code and data stored on hard disk drives.

Mass storage devices used in a general purpose computer typically allow code and data to be read from and written to the mass storage device. In a gaming machine environment, modification of the gaming code stored on a mass storage device is strictly controlled and would only be allowed under specific maintenance type events with electronic and physical enablers required. Though this level of security could be provided by software, IGT gaming computers that include mass storage devices preferably include hardware level mass storage data protection circuitry that operates at the circuit level to monitor attempts to modify data on the mass storage device and will generate both software and hardware error triggers should a data modification be attempted without the proper electronic and physical enablers being present. In addition to the basic gaming abilities provided, these and other features and functions serve to differentiate gaming machines into a special class of computing devices separate and distinct from general purpose computers.

Gaming Systems

Figure 2:
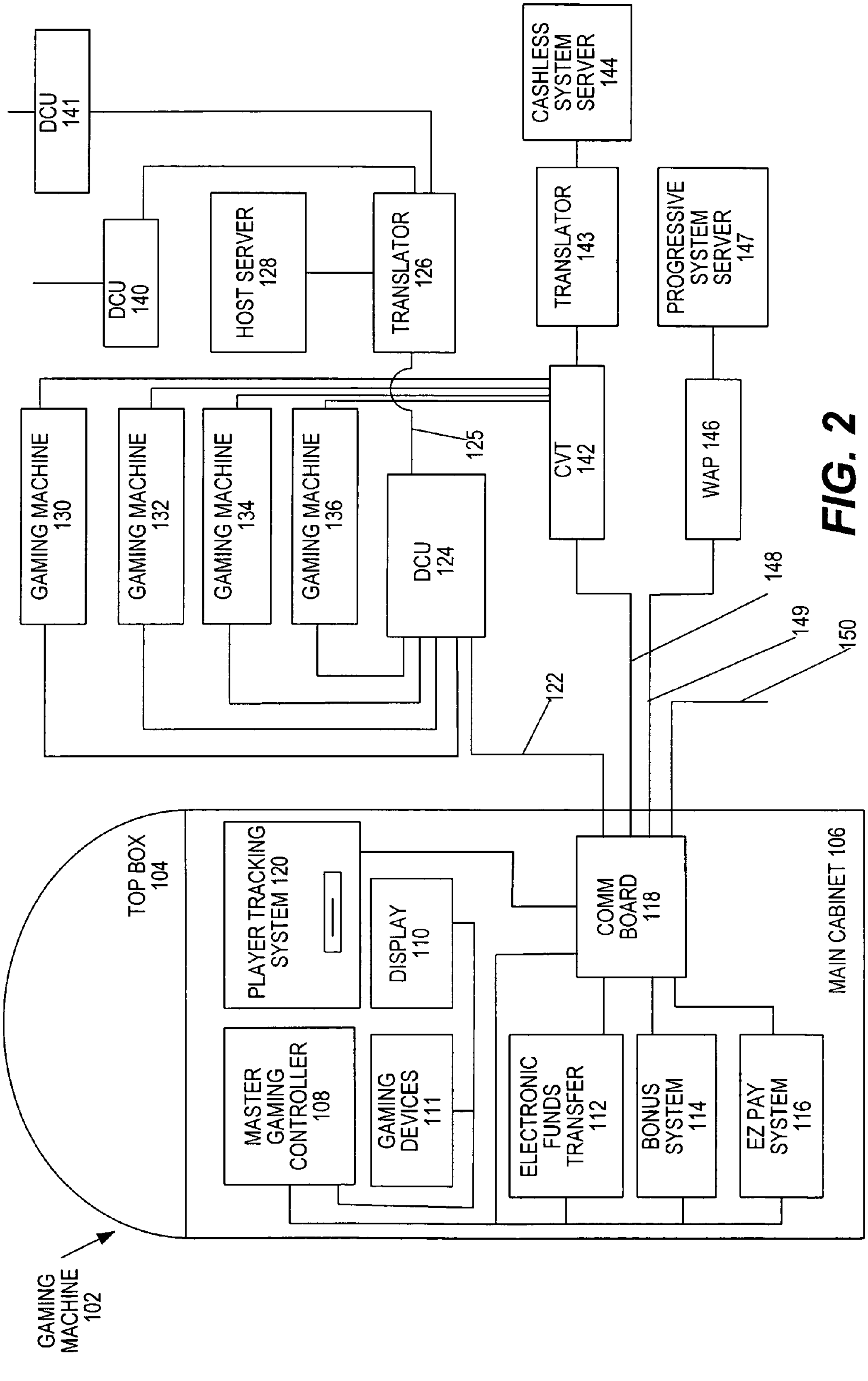
FIG. 2 illustrates a block diagram depicting gaming machines within an exemplary dedicated communication network connected to a host server via a typical exemplary DCU.

FIG. 2 illustrates a block diagram depicting gaming machines within a dedicated communication network connected to a host server via a typical DCU. In FIG. 2, gaming machine 102, which can be identical or similar to gaming machine 2 of FIG. 1, and the other gaming machines 130, 132, 134, 136, each typically include a main cabinet 106 and a top box 104. The main cabinet 106 usually houses the main gaming elements and can also house peripheral systems, such as those that utilize dedicated gaming networks. The top box 104 may also be used to house these peripheral systems. As earlier described, the master gaming controller 108 typically controls the game play on the gaming machine 102 and receives or sends data to various input/output devices 111 on the gaming machine 102. The master gaming controller 108 may also communicate with a display 110, electronic funds transfer system 112, bonus system 114, EZPay™ system 116, such as cashless ticketing system, and player tracking system 120. The systems of the gaming machine 102 typically communicate the data onto the network 122 via a communication board 118.

In the past, the amount of data transmitted over gaming networks in a casino environment has not been large. For instance, data on metering information, such as the amount of money input into the gaming machine and the amount of money output from the gaming machine, requires only a small amount of network bandwidth to transmit. Large data transfers, such as transmitting large files between gaming devices, have not been performed in a casino environment. Large file transfers have not been implemented because of regulatory and security requirements unique to the gaming industry. In the present illustration, the gaming machines 102, 130, 132, 134, and 136 are connected to a dedicated gaming network 122. In general, the DCU 124 functions as an intermediary between the different gaming machines on the network 122 and the host server 128. In general, the DCU 124 receives data transmitted from the gaming machines and sends the data to the host server 128 over a transmission path 126. In some instances, when the hardware interface used by the gaming machine is not compatible with the host server 128, a translator 125 may be used to convert serial data from the DCU 124 to a format accepted by the host server 128. The translator may provide this conversion service to a plurality of DCUs, such as 124, 140 and 141. The DCUs in the network do not communicate with each other.

Further, in some dedicated gaming networks, the DCU 124 can receive data transmitted from the host server 128 for communication to the gaming machines on the gaming network. The received data is typically communicated synchronously to the gaming machines on the gaming network. Within a casino, the gaming machines 102, 130, 132, 134, 136 are typically located on the gaming floor for player access, while the host server 128 is usually located in the backroom of the casino or at another location. Thus, transmission path 126 is usually the sole transmission path between the DCU 124 and the host server 128. Should the transmission path 126 be disrupted or severed, data sent from the gaming machines is either lost, or, in some cases, may need to be individually collected from each of the gaming machines on the gaming network and then separately provided to the host server 128. In a gaming network, gaming machines 102, 130, 132, 134, 136 may be connected through multiple communication paths to a number of gaming devices that provide gaming services. For example, gaming machine 102 is connected to four communication paths, 122, 148, 149 and 150. As described above, communication path 122 allows the gaming machine 102 to send information to host server 128. Via communication path 148, the gaming machine 102 is connected to a clerk validation terminal 142. The clerk validation terminal 142 is connected to a translator 143 and a cashless system server 144 that are used to provide cashless gaming services to the gaming machine 102. Gaming machines 130, 132, 134, 136 are also connected to the clerk validation terminal 142 and may receive cashless system services.

Via communication path 149, the gaming machine 102 is connected to a wide area progressive ("WAP") device 146. The WAP is connected to a progressive system server 147 that may be used to provide progressive gaming services to the gaming machines. Although not shown, the other gaming machines may also be connected to the WAP device 146. Via communication path 150, gaming machine 102 may be connected with additional gaming devices (not shown) that provide other gaming services. The gaming devices located on the different communication paths, such as the four communication paths, 122, 148, 149 and 150 do not communicate with one another, because each communication path is located on a separate and independent network. For instance, the WAP 146 on communication path 149 does not communicate with the CVT 142 on communication path 142. As another example, cashless system server 144 does not communicate with the progressive system server 147 or the host server 128.

As described above, each gaming machine 102, 130, 132, 134 may be connected through multiple communications paths on separate and independent networks to a number of gaming devices executing a gaming application. With this network topology, the total number of communication paths is proportional to the number of gaming applications with an independent network. For a large number of gaming machines and gaming applications in the network, the large total number of communication paths increases the costs of maintaining the network, makes reconfiguring the network difficult and time consuming and makes expanding the network costly (e.g., adding more gaming devices).

Figure 3:
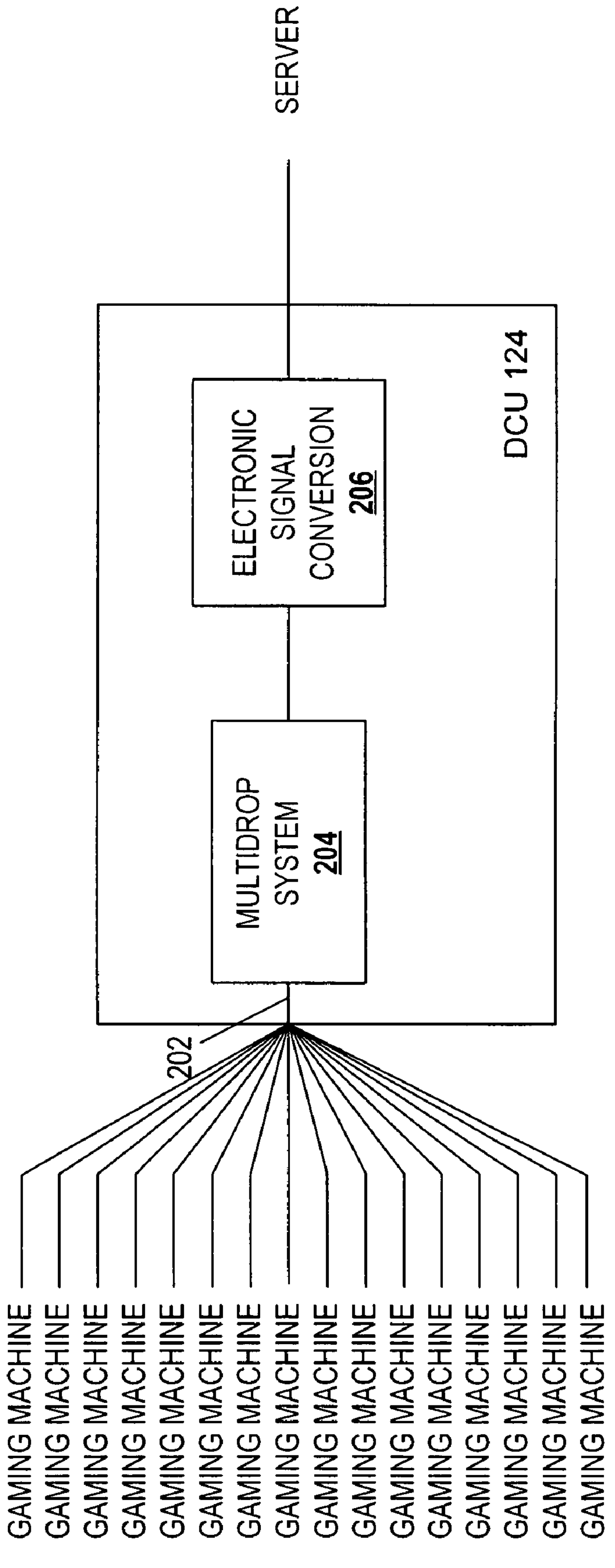
FIG. 3 illustrates a block diagram depicting the exemplary DCU shown in FIG. 2 in further detail.

FIG. 3 illustrates a block diagram depicting one example of the DCU 124 shown in FIG. 2 above. Generally, the DCU 124 functions to accept a single network connection 202 from each of a plurality of gaming machines (16 gaming machines are shown in the figure). On the gaming machine side, the DCU 124 is not connected to any other gaming devices other than the gaming machines. The DCU 124 polls for data from each of the gaming machines and converts the data signals to an electronic signal data format signal accepted by the host server 128 (e.g., 5 volts to 28 volts). The DCU 124 then outputs the formatted electronic data signal to the host server 128. The DCU 124 may also receive a formatted data signal from the host server 128, convert the formatted data signal to an electronic signal format used by the gaming machines, and send the reformatted signal to the gaming machines. Electronic signal conversion such as from a signal format used by the gaming machines (e.g., fiber optic, RS-232, RS-485) to a signal format used by the host is provided by the electronic signal conversion element 206. For instance, a fiber optic data signal used by the gaming machines may be converted to an RS-232 signal format used by the host server. The DCU 124 may communicate with the gaming machines using a communication connection, such as an RS232 communication connection, an RS485 communication connection or fiber optic communication connection. The DCU 124 performs the communications using a multi-drop system 204.

In the multi-drop system, all messages are broadcast to all of the gaming machines connected to the DCU 124. For instance, when DCU 124 polls an individual gaming machine for information, all of the gaming machines receive the message requesting polling information (i.e., the message is broadcast to all the machines on the network). However, only the gaming machine identified in the request responds to the message. As another example, when a message is sent to an individual gaming machine from a host server, all of the gaming machines receive the message but only the addressed gaming machine will process the message. Typically, the DCU 124 may be connected to a maximum of 32 gaming machines. Thus, the DCU 124 is an important node in the gaming network. Any difficulties within the DCU 124 or within the network between the DCU 124 and the host server may result in a disruption of services for a large number of gaming machines.

Specialized Gaming Systems

Figure 4:
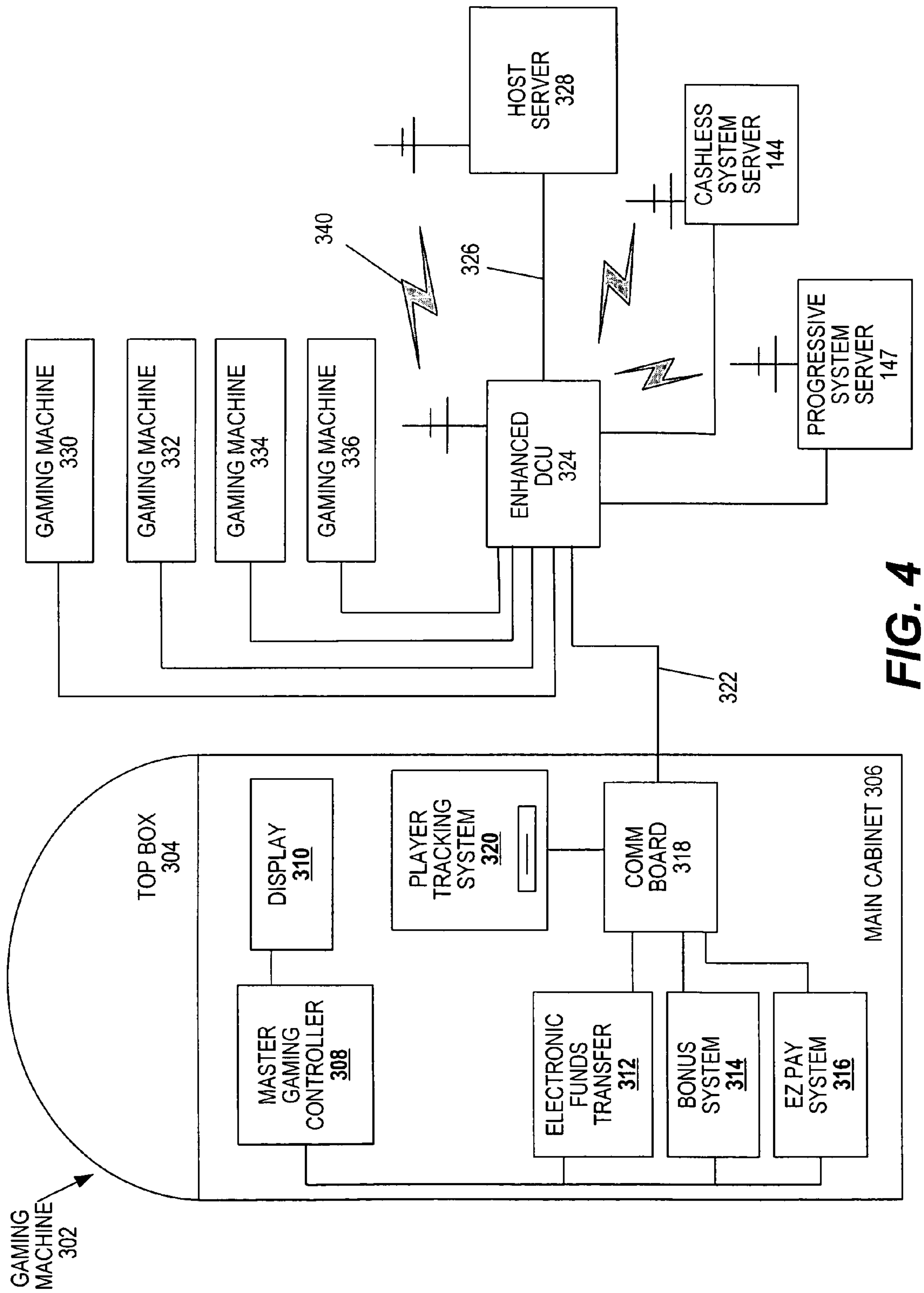
FIG. 4 illustrates a block diagram depicting gaming machines within an exemplary dedicated communication network connected to a host server via an enhanced DCU that provides redundant communication and network mediation according to one embodiment of the present invention.
Figure 5:
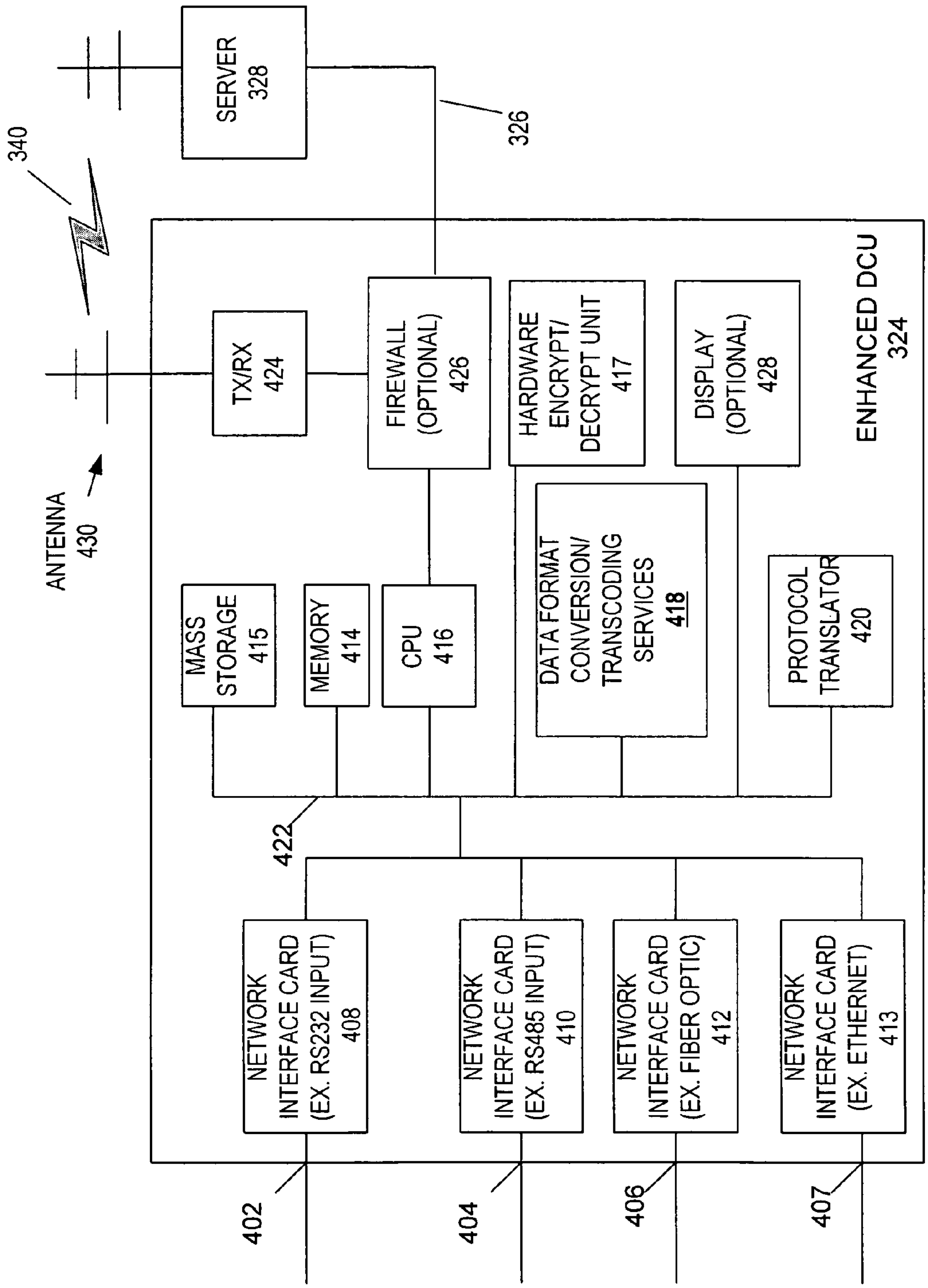
FIG. 5 illustrates a block diagram depicting the exemplary enhanced DCU shown in FIG. 4 according to one embodiment of the present invention.

The present invention provides specialized gaming systems having enhanced DCUs that provide redundant communication paths and network mediation between a plurality of gaming machines connected on a gaming communication network and a host server. FIGS. 4 and 5 illustrate several aspects of the present invention, which provides redundant gaming communication and network mediation between gaming machines on a gaming communication network and a host server. It will be appreciated that various hardware and software architectures may be used to implement the present invention and that the embodiments shown in FIGS. 4 and 5 are intended to illustrate the present invention rather than limit it. Further, any of the embodiments described herein may also provide for the further encryption and/or physical protection of the data being stored and/or transmitted. Additionally, although the present invention is described in some instances with regard to one host server, the present invention may include more than one host server.

FIG. 4 illustrates a block diagram generally depicting gaming machines within a specialized dedicated gaming communication network connected to a host server via an enhanced DCU. In FIG. 4, the components of the gaming machine 302, and the other gaming machines 330, 332, 334, 336 are similar to those described with regard to gaming machine 102, and the other gaming machines 130, 132, 134, 136 in FIG. 2, and are thus not described again at this point. In the present illustration, the gaming machine 302 and the other gaming machines 330, 332, 334, 336 are connected to a dedicated gaming communication network 322. Data transmissions between the gaming machines on the gaming communication network 322 and the host server 328 are mediated by the enhanced DCU 324 of the present invention.

The enhanced DCU 324 provides for a first transmission path 326 between the gaming machines on the gaming communication network 322 and the host server 328 and a second, redundant transmission path 340 between the gaming machines on the gaming communication network 322 and the host server 328. Although not required, it is preferred that the first and second transmission paths 326, 340 be different transmission media. For example, the first transmission path 326 may act as the primary transmission path and can be a land cable, such as an RS-232 cable, an RS-485 cable, Ethernet Cable or a fiber optic cable, among others. The second, redundant transmission path 340 may be a wireless transmission path, such as a radio frequency ("RF") transmission path. It will be appreciated that the reverse designation may also be utilized, and that both paths could be cable based or wireless, as desired. Further, any of a wide variety of transmission media may be used and the above examples are merely to illustrate the present invention.

When one of the two transmission paths 326, 340 is disrupted, severed or busy, the remaining transmission path can provide continuing transmission to the host server 328. Thus, for example, if the first transmission path 326 is disrupted, the second transmission path 340 may still provide continuing transmissions to the host server 328. In one example, the enhanced DCU 324 may transmit substantially simultaneously over both the first and second transmission paths 326, 340. In another example, the enhanced DCU 324 may transmit over a primary transmission path, for example, first transmission path 326, and then activate the use of the second, redundant transmission path 340 when the first transmission path 326 is disrupted or severed. In the event both the first and second transmission paths 326, 340 are disrupted or severed or busy, the enhanced DCU 324 may further act as a local interim server and store the data received from the gaming machines on the gaming communication network 322 until such time as a transmission path to the host server 328 is restored and the data can be transmitted.

By storing the data from gaming machines on the gaming communication network 322, the enhanced DCU 324 permits data to be retained that might otherwise be lost in some network configurations and may alleviate the need for individual readings of gaming machines in other network configurations until restoration of transmissions to the host server 328. In gaming communication networks in which the host server 328 communicates data to the gaming machines on the gaming communication network 322, the enhanced DCU 324 may also act as a local data cache for data downloaded to an individual gaming machine. The local data cache on enhanced DCU 324 may allow asynchronous communication of the downloaded data to the individual gaming machine. Asynchronous communication of data via the enhanced DCU may be utilized to prevent any degradation in the gaming machine performance resulting from activities performed during the data download process.

As an example, a remote device may send a large data download, such as, but not limited to, a requested game to a gaming machine while the gaming machine is providing game play. Game play on the gaming machine may be affected when the gaming machine is engaged in the transfer of a large amount of data. Therefore, the gaming machine may block large data transfers while it is engaged in providing game play. Asynchronous communication of data by the enhanced DCU 324 mitigates disruption of game play on the gaming machines as a result of a large data download and allows the gaming machine to receive data when it is ready. As another example, a player on gaming machine 302 playing a bonus game may request information describing the prizes that can be played for during the game. The enhanced DCU 324 could transmit this request to the host server 328. When the information is retrieved and transmitted to the enhanced DCU 324, the data are stored at the enhanced DCU 324 until the complete file of information is received. The enhanced DCU 324 would then transmit the data to gaming machine 302 when the gaming machine 302 indicates it is available for transmissions from the enhanced DCU 324. This process of storage and asynchronous transmission can be used for other gaming communication network information, such as game software updates, payment transactions, gaming services software updates, and so forth.

Figure 6:
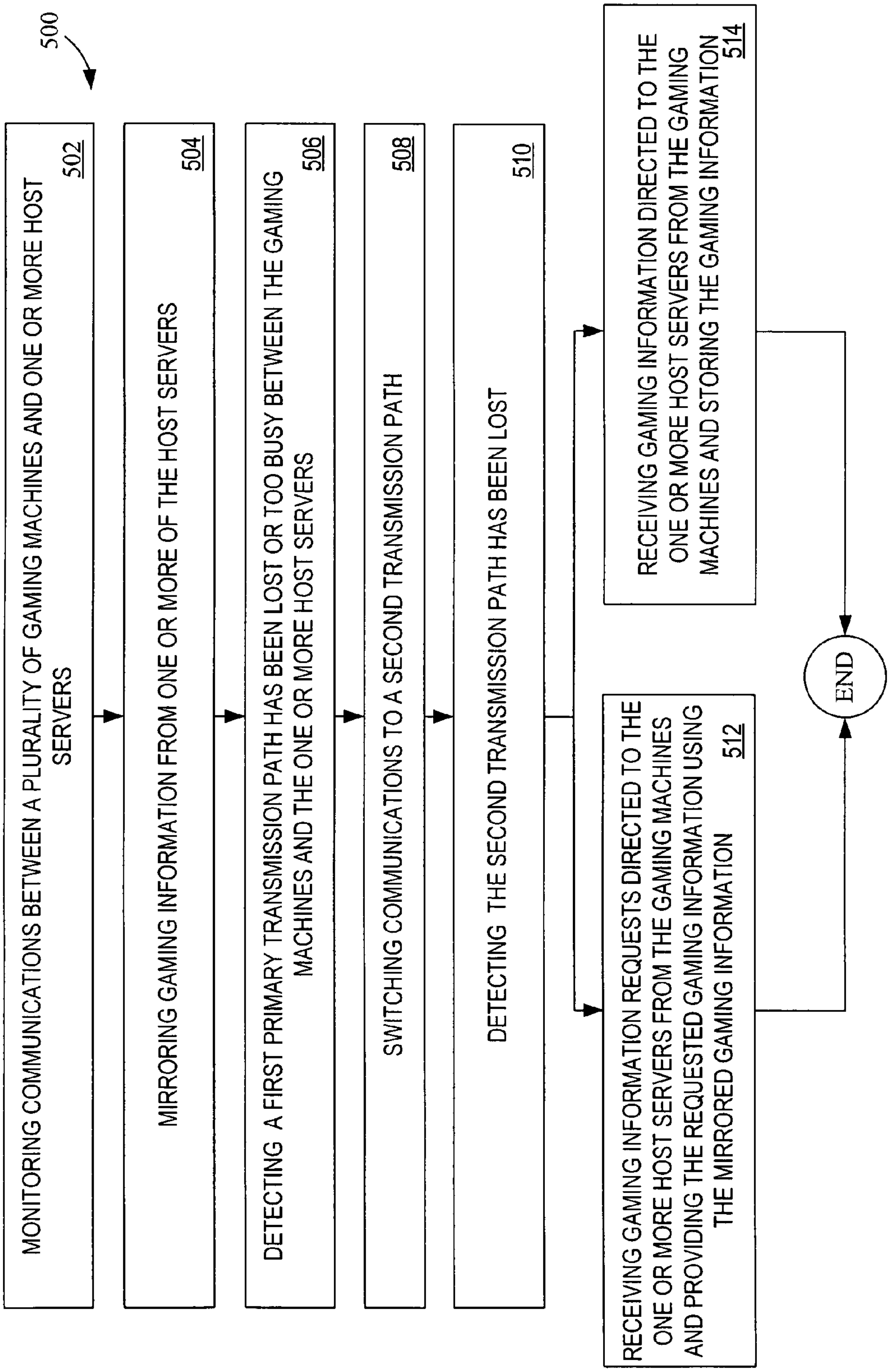
FIG. 6 illustrates a flow chart of one exemplary method of providing network meditation using an enhanced DCU according to one embodiment of the present invention.

In gaming communication networks in which a set of particular data may be requested from the gaming machines, such as bonus prize descriptions, programs, and advertisements, the enhanced DCU 324 may also act as a local cache of this information for accessing over the gaming communication network 322 without having to repeatedly transmit requests for the information to the host server 328. For example, a player on gaming machine 302 may wish to access the casino show schedule for the week. This information may be cached at the enhanced DCU 324 for accessing by the gaming machine 302 without having to transmit a request to the host server 328. In this way, the enhanced DCU 324 alleviates some of the transmission load from the first and/or second transmission paths 326, 340. Other types of data typically retained at the host server 328, may also be stored on the enhanced DCU 324, through mirroring of all or selected data sets on the host server 328, such as, for example, game licensing data, accumulation of player tracking points, player profile information, cashless transaction authorizations, player preference information, game paytables, game software and frequently requested information (e.g., show times, directions). During disruption of transmission paths to the host server 328, the enhanced DCU 324 may act as a local interim server to the gaming machines on the network to enable game play to continue. This method is further described herein with reference to FIG. 6.

In another embodiment, when network traffic is busy, the DCU 324 may act as a local interim server to prevent further network performance degradation. The busyness of a network segment refers to the amount of information passing through the segment at a particular time. A given network segment may allow for a maximum transmission rate (bandwidth). Based upon a regulation scheme used for mediating network traffic, such as the communication load or message traffic on a network segment exceeding a threshold, the DCU 324 may store data in the local interim server and then resend the information when the network segment is less congested or send the information via an alternate communication path. In yet another embodiment, the interim server capabilities on the DCU 324 may be used to reduce network traffic on portions of the network by storing commonly requested information or applications. To simplify the gaming communication network, the number of communication paths may be reduced and the remaining communication paths may be shared between a plurality of gaming devices running a heterogeneous set of applications.

Traditionally, a separate communication path has been used for each gaming application/hardware set. Player tracking/accounting applications/hardware can use a first communication path, cashless systems applications/hardware can use a second communication path, progressive applications/hardware can use a third communication path, linked bonus game applications/hardware can use a fourth communication path and so forth. With the present invention, a common communication path may be used for a plurality of heterogeneous gaming applications. For instance, the same communication path may be used to transmit gaming application information related to progressive games, cashless transactions, player tracking/accounting services and linked bonus game applications. With shared communications paths, however, network reliability and managing bandwidth on the gaming communication network becomes more important. This is especially true for applications, such as downloading games that require large data transfers. For example, when the DCU 324 supports game downloads from a game server, commonly requested games may be stored on the DCU 324 to reduce network traffic between the DCU 324 and the game server. The additional bandwidth between the DCU 324 and the game server may be used by other gaming applications on the game server or other host servers/gaming devices that share this network segment.

To transfer data in a secure manner, data downloaded to the enhanced DCU 324 from a host server 328 may be encrypted. In one embodiment of the present invention, an asymmetric encryption scheme incorporating a public-private encryption key pair may be used. Information encrypted with the private encryption key may be decrypted only using the corresponding public encryption key of the public-private encryption key pair and information encrypted with the public encryption key may be decrypted only using the private encryption key of the public-private encryption key pair. Thus, an entity with a private encryption key of public-private encryption key pair may give its public encryption key to many other entities. The public key may be made available (via an Internet server, e-mail, or some other means) to whoever needs or wants it. The private key, on the other hand, is kept secret. Only the owner of the key pair is allowed to possess the private key. The other entities may use the public encryption key to encrypt data. However, as long as the private encryption key remains private, only the entity with the private encryption key can decrypt information encrypted with the public encryption key.

In general, public-key encryption algorithms are very slow, and it is impractical to use them to encrypt large amounts of data. In practice, symmetric algorithms are used for encryption/decryption of large amounts of data, while the public-key algorithms are used merely to encrypt the symmetric keys. Similarly, it is not usually practical to use public-key signature algorithms to sign large messages. Instead, a hash may be made of the message and the hash value may be signed. Methods of asymmetric and symmetric keys that may be used to transfer encrypted data in the present invention are described in commonly owned and co-pending U.S. patent application Ser. No. 10/116,424, by Nguyen et al., filed Apr. 3, 2002, and entitled “Secured Virtual Network in a Gaming Environment,” which is incorporated herein by reference in its entirety and for all purposes.

A private key of a public-private signature key pair may also be used to sign a message. The signature may be used for authenticating the message. When the private signature key is used to sign a message, then the public signature key must be used to validate the signature. The Digital Signature Standard (“DSS”) authorized by the U.S. government uses a private signature key, a public encryption key and a secure hash algorithm for generating and authenticating electronic signatures. For example, to send someone a digitally signed message, the message is signed with a private signature key, and the receiver of the message may verify the signature by using the public signature key corresponding to the private signature key. Prior to beginning a secure data transfer, the enhanced DCU 324 and the host server may have exchanged public encryption keys or public signature keys and other security information that may be used to establish the identity of the sender of a message to the enhanced DCU 324 and to identify messages sent from the enhanced DCU 324. Details of exchanging encryption keys in a secure manner that may be applied under the present invention are described in commonly owned U.S. Pat. No. 6,866,586, by Oberberger, et al., entitled “Cashless Transaction Clearinghouse,” which is incorporated herein by reference in its entirety and for all purposes.

The enhanced DCU 324 may perform secure transactions with many different devices. As an example, a secure exchange between the enhanced DCU 324 and the host server 328 is described. To initiate a data transfer, the host server 328 and the enhanced DCU 324 may exchange messages that are encrypted with the public-private key pairs by used each other. This process may be initiated to authenticate the identities the devices involved in the data transfer. For instance, the host server may send a message to the enhance DCU 324 that is encrypted with the public encryption key of the DCU. The DCU 324 may decrypt the message with its private encryption key and then send a reply encrypted with the public encryption key of the host servers 328. The host server 328 may decrypt the message with its private key. Since only the DCU 324 and the host server 328 have access to their private keys, the identities of the DCU 324 and the host server 328 are established.

Next, the enhanced DCU 328 may receive a message from the host server 324 with data encrypted using a symmetric encryption key and a symmetric encryption key encrypted using the public encryption key of the enhanced DCU. The enhanced DCU may decrypt the symmetric encryption key using its private key and then decrypt the data encrypted with the symmetric key using the symmetric encryption key. The decrypted data may include a target destination such as information identifying a gaming machine. Using the target destination information, the enhanced DCU 328 may forward the information to the gaming machine. The process may also be implemented in reverse. For instance, the enhanced DCU 328 may receive unencrypted data from a gaming machine for a target device such as the host server 328. The DCU 328 may generate a symmetric encryption key and encrypt the data from the gaming machine with the symmetric encryption key. The DCU 328 may then encrypt the symmetric encryption key with a public encryption key used by the target device and send a message with the encrypted symmetric encryption key and the data encrypted with the symmetric encryption key to the target device.

One advantage of the enhanced DCU 324 is that the number of communication paths on the gaming communication network can be reduced as compared to the exemplary system described in FIG. 2. For instance, in FIG. 2, gaming machine 102 uses three separate communication paths to communicate with the host server 128, the cashless system server 144, and the progressive system server 147. Using the enhanced DCU 324, the gaming machine 302 may communicate with the host server 328, the cashless system server 144 and the progressive server system server using one communication path 322. Thus, the number of communication paths can be reduced from 3 or more to 1. The enhanced DCU 324 also serves as a central node or hub in the gaming communication network by enabling communications between the gaming machine and a plurality of other gaming devices, such as but not limited to the host server 328, the cashless system server 144 and the progressive system server 147. As a hub in the gaming communication network, the enhanced DCU 324 may enable communication between gaming devices executing gaming applications that traditionally do not communicate with another. For example, besides communicating with each of the gaming machines 302, 332, 334 and 336, the host server 328 may communicate with the cashless system server 144, the progressive system server 147 and other gaming devices (not shown) on the gaming communication network via the enhanced DCU 324.

To enable communication between gaming devices, the enhanced DCU 324 may provide protocol mediation service to different gaming devices connected to the gaming communication network that use different communication protocols. For example, gaming machines from different manufactures and similar gaming software applications from different developers may use different communication protocols. For instance, gaming machines by IGT use a Slot Accounting System (“SAS”) protocol to talk to accounting applications made by IGT. Yet, gaming machines by Bally’s gaming systems of Las Vegas, Nev. use a Slot Data System (“SDS”) protocol to talk to accounting applications made by Bally’s. Using protocol mediation provided by the enhanced DCU 324, IGT gaming machines using SAS may communicate with a Bally's accounting application that uses SDS. Further, IGT gaming machines using SAS may communicate with Bally's gaming machines using SDS, Bally's gaming machines using SDS may communicate with IGT accounting applications using SAS, and IGT accounting applications using SAS may communicate with Bally's accounting applications using SDS.

In the protocol mediation process, the enhanced DCU 324 may receive a message from a first gaming device in a first communication protocol addressed to a second gaming device. The second gaming device may be referred to as the receiver of the message or the message destination. The message may or may not indicate a second communication protocol used by the second gaming device that is needed for the translation. When the message indicates the second communication protocol needed for the translation, the enhanced DCU 324 translates the message to the second communication protocol and forwards the translated message to the second gaming device. When the message does not indicate the second communication protocol, the enhanced DCU 324 attempts to determine the second communication protocol to use in the translation process. The message from the first gaming device may include additional information about the sender of the message, the receiver of the message, the applications generating and using the information and combinations thereof. This protocol identification information may be used by the enhanced DCU 324 to determine the communication protocol needed for the translation. The protocol identification information may comprise application information and device information. The application information may include but is not limited to a name of the application, a manufacturer of the application and a version number and the device information may include a device type, a manufacture, a version number and communication protocols supported by the device (a gaming device of the present invention may support one or more communication protocols). Using the information in the message, the enhanced DCU 324 may determine the communication protocol needed for the translation, perform the translation and send the message to the second gaming device designated as the receiver of the message. The enhanced DCU 324 may store information about gaming devices on the gaming communication network that allows it to determine what communication protocol to be used for translation. For instance, the enhanced DCU 324 may store a table listing gaming devices, supported applications and protocols used by each application. Using information it has received from a message sender, information it has received from a message receiver (i.e., intended destination for a message) or combinations thereof, the enhanced DCU 324 may use the stored information to determine the correct protocol to be used in the translation. When the enhanced DCU 324 cannot determine what communication protocol is needed, the enhanced DCU 324 may send an error message to the sender of the message or request additional information from the sender of the message, the receiver of the message or combinations thereof.

In one embodiment, the enhanced DCU 324 may contact the second gaming device (i.e., the intended destination for the message) via a message that provides information from the message sender that can be used to identify the needed communication protocol such as the application type and the identity of the message sender. The second gaming device may respond with a reply message to enhanced DCU 324 that indicates the second communication protocol that the enhanced DCU should use to translate the message. When the enhanced DCU 324 receives the reply message from the second gaming device with the necessary protocol information, it translates the message into the format of the specified communication protocol and then the forwards the message to the second gaming device. With the enhanced DCU 324 serving as a communication hub in the gaming network, another function that the enhanced DCU 324 may perform is access control to the gaming network. As part of access control, in some cases, the enhanced DCU 324 may attempt to authenticate one of the identity of the sender of a message, the identity of the receiver of the message or identities of both the sender and the receiver of the message, that pass through the enhanced DCU. For instance, when the enhanced DCU 324 receives a message from a gaming device on the gaming communication network, the enhanced DCU 324 may try to determine if the gaming device is authorized to be on the gaming communication network.

In another embodiment, the enhanced DCU 324 may receive a message from a first gaming device requesting a gaming service from a second gaming device on the gaming communication network. Before forwarding the message to the second gaming device, the enhanced DCU 324 may try to determine if the first gaming device is authorized to receive the requested gaming service. For example, when the first gaming device is a gaming machine that has requested a download of a game from a second gaming device which may be a game server or another gaming machine, the enhanced DCU 324 may check licensing information, stored on the DCU 324 or contact another gaming device storing the licensing information, to determine if the first gaming device has a valid license for the requested game. When the first gaming device has a valid license, the enhanced DCU 324 may forward the request to the second gaming device. When first gaming device does not have a valid license or in general when the first gaming device is not authorized for the requested gaming service, the enhanced DCU 324 may deny the request by not forwarding the message. When the requested service is denied, the enhanced DCU 324 may send an error message to the first gaming device indicating the request has been denied and may also store a log of the transaction. Further details regarding providing communication protocols in a gaming environment are described in commonly owned U.S. Pat. No. 6,884,174, by Lundy et al., entitled "Communication Protocol for Gaming System Configuration," which is incorporated herein by reference in its entirety and for all purposes.

FIG. 5 illustrates a block diagram depicting the enhanced DCU shown in FIG. 4 according to one embodiment of the present invention. In FIG. 5, the enhanced DCU 324 of the present invention provides at least one network input connection 402 and associated network interface card ("NIC") 408. Network input connections and associated NIC performance are well known to those of skill in the art and are not further described herein. In some embodiments, the enhanced DCU 324 may also provide additional network input connections and associated NICs to enable the enhanced DCU 324 to be utilized with a variety of gaming communication networks having different transmission media, such as fiber optic cable, RS-232 cable, RS-485 cable, Ethernet cable, and wireless ports, such as RF and infrared ("IR") ports. For example, in FIG. 5 the enhanced DCU 324 also provides network input connections 404, 406, and 407, with associated NICs 410, 412 and 413. Data transmitted from the gaming communication network 322 passes from the NIC 408 onto the bus structure 422 interconnecting various components of the enhanced DCU 324 and managed by the local CPU 416. Further details of various NICs that may be used with the present invention are described in commonly owned and copending U.S. patent application Ser. No. 09/618,365, by Nguyen, et al., filed Jul. 18, 2000, and entitled "Configurable Communication Board For A Gaming Machine," which is incorporated herein by reference in its entirety and for all purposes.

Enhanced DCU 324 may optionally include a hardware encrypt/decrypt unit 417. The hardware encrypt/decrypt unit may be a specialized logic device, such as crypto chip, used for encryption and decryption of data. An advantage of the logic device is that it may be faster or more secure than some standard software encryption algorithms. Data destined for the host server 328 may simply be formatted according to a designated file format by the data file conversion module 418 and output over the first and/or second transmission paths 326, 340. The file format conversion may be a part of content transcoding. In content transcoding, the contents of the data sent to a particular device may be optimized through a series of transformation for the capabilities of the device. For instance, a common set of data may be sent to both a cell phone and a gaming machine. The data may be tailored for the capabilities of the gaming machine and thus no transformations may be required. However, for the cell phone, the data may be appropriately scaled to account for the hardware capabilities such as display size, memory and processing power of the cell phone. Further details of transcoding are described with respect to FIG. 7 below.

As earlier described, the present invention provides redundant network mediation and communication paths between gaming machines on the gaming communication network 322 and the host server 328 utilizing a first transmission path 326 and a second, redundant transmission path 340. It will be appreciated that the first and the second transmission paths 326, 340 may be any of a variety of transmission media, such as wireless, fiber optic cable, and twisted pair cable, and that the present illustration is merely illustrative of the present invention and is not intended to in any way limit the scope of the present invention. In one embodiment, the first transmission path 326 may be a land cable and serve as the primary transmission path to the host server 328, and the second transmission path 340 may be a wireless transmission path, such as an RF or IR transmission path. Thus, the enhanced DCU 324 may also include a transceiver 424 to enable data transmission and reception over the second transmission path 340. In some embodiments, the data may be transmitted over both the first and second transmission paths 326, 340. In other embodiments, the data may be transmitted over the primary transmission path, for example, the first transmission path 326, unless the primary transmission path has been disrupted, and only then transmitted over the redundant transmission path, for example the second transmission path 340, to provide continuing transmission of data to the host server 328.

As earlier described, in the event both transmission paths 326, 340 are disrupted, the enhanced DCU 324 can store the data in a memory structure 414 and/or 415 until such time as a transmission path to the host server 328 is established and the data can be sent. Further, the enhanced DCU 324 can act as an interim server to the gaming machines on the gaming communication network 322 and be programmed to perform some actions typically undertaken by the host server 328. For instance, the enhanced DCU 324 may continue to accumulate player tracking points and metering information when connection to a player tracking server has been lost. As another example, the DCUs may record security events when network connections have failed or a power failure has occurred. In yet another example, the enhanced DCU may accumulate progressive jackpot information in the case when an interruption in a progressive network has occurred. In another embodiment, the enhanced DCU 324 may store transaction information used to authorize cashless transactions.

In gaming communication networks where data is transmitted from the host server 328 to the gaming machines on the network 322, the enhanced DCU 324 may also act as a download server, license server and local cache. The data may be cached in a RAM, DRAM, SDRAM memory 414. Further, the enhanced DCU may include a mass storage device such as a hard drive, DVD drive and CD drive for storing large amounts of cached data. Further, the mass storage device 415 may be used to store data and applications mirrored from other gaming devices. Some host servers 328 may download gaming machine software updates, or encryption key updates, or other data utilized by the gaming machines on the gaming communication network. Typically, to receive these updates, the gaming machines on the gaming communication network must be taken out of game play mode to accept synchronous transmission of the data.

The enhanced DCU 324 allows the host server 328 to download the data to a memory structure, such as memory 414 and/or 415, where it can be stored and transmitted to the gaming machines of the gaming communication network 322, as they become available. This asynchronous transmission of the data enables game play to continue uninterrupted on a gaming machine, thus mitigating game play disruption and downtime for software and/or data downloads from the server 328. The enhanced DCU 324 also may act as a local cache for information such as prize descriptions, casino schedules, advertisements, and other information that is repeatedly accessed by the gaming machines on the gaming communication network 322. This information may be stored in the memory structure, 415 or another memory structure specifically designated for cache information.

The enhanced DCU 324 may also act as a license server. As a license server, the DCU 324 may store licensing information that allows games and other gaming software to be downloaded from one gaming device to another gaming device such as from a game server to a gaming machine or between gaming machines. The licensing information may also be used to determine whether gaming software on a particular gaming device may be executed. For example, a number of games may be stored on a gaming machine but the gaming machine may only be able to load or execute games specified in licensing information stored on the DCU 324. DCU 324 may track game usage and store game usage information that may be used to bill for gaming software in a pay-per-use model. For instance, the DCU 324 may track information for a number gaming machine regarding what games have been used on the machine over a given time period. This information may be used to calculate a monetary charge based upon the amount of game usage, such as $0.05 cent per use times the number of games that have been played. In some embodiments, the enhanced DCU 324 may further include a display 428 to provide casino personnel with information regarding the performance of the enhanced DCU 324 and/or a firewall 426 to provide transmission security. Further, as described with respect to FIG. 4, in some embodiments, encryption systems and secure/unsecure key storage memory modules may be included in the enhanced DCU 324.

In other embodiments, as described with respect to FIG. 4, when protocol information is available, the enhanced DCU 324 may also provide protocol translation for messages sent between gaming devices connected to the gaming communication network. In these embodiments, the enhanced DCU 324 may further include a protocol translator 420 that enables the enhanced DCU 324 to format data into a protocol suitable for use with a receiving gaming device connected to the gaming communication network. As earlier described with regard to FIGS. 4 and 5, the present invention can provide network mediation in which the enhanced DCU 324 acts as an interim server to the gaming machines on the gaming communication network 322 and be programmed to perform some actions typically undertaken by the host server 328. In one embodiment of the present invention, this interim server function may be accomplished by enabling all or selected functions of the host server 328 to be mirrored on the enhanced DCU 324.

FIG. 5 is a flow chart of a method of providing network mediation using an enhanced DCU according to one embodiment of the present invention. According to the method 500, at step 502 the enhanced DCU monitors communications between a plurality of gaming machines on the network and one or more host servers. A plurality of enhanced DCUs may perform this task. Therefore, the enhanced DCUs may also communicate with one another in a peer-to-peer network, as shown and described below in FIG. 7. At step 504, the enhanced DCU mirrors gaming information from one or more of the host servers. This gaming information can be all the gaming information from the host server(s) or selected information. Examples of mirrored information include game licensing information, accumulation of player tracking points, player profile information, cashless transaction authorizations, player preference information, game paytables, game software and frequently requested information (e.g., show times, directions). Mirroring enables the enhanced DCU to locally maintain current specified information held at the host server(s) should the communication to the host server (s) be lost or a transmission path become too busy.

At step 506, the enhanced DCU detects the loss of the first, primary transmission path, and at step 508, the enhanced DCU then switches communications to a second transmission path, which may or may not have been functioning in a redundant capacity. At step 510 the enhanced DCU detects the loss of the second transmission path. Assuming there are no further transmission paths, this loss signals loss of connection to the host server(s) and initiates the interim server functions of the enhanced DCU. In some instances, at step 512, the enhanced DCU may receive gaming information requests from the gaming machines directed to the one or more host servers and provide the requested gaming information to the gaming machines using the mirrored gaming information. In other instances, at step 514, the enhanced DCU may receive gaming information directed to the one or more host servers from the gaming machines and store the gaming information. Once communication with the host server(s) is re-established, the enhanced DCU can then communicate this information to the host server.

As illustrated in the foregoing description and drawings, the present invention provides an enhanced DCU that provides redundant mediation in a gaming communication network. The enhanced DCU includes at least a first transmission path and a second, redundant transmission path. In the event one of the transmission paths is disrupted, the other transmission path provides continuing transmissions between the gaming communication network and the host server. In the event both transmission paths are disrupted, the enhanced DCU functions as a local interim server and stores data from the gaming machines until such time as the data can be transmitted to the host server. The enhanced DCU may also act as a local download server and asynchronously transmit data to the gaming machines on the gaming communication network to minimize game play disruption.

Further, the enhanced DCU may serve as a local cache of information that is regularly accessed by the gaming machines so as to reduce the transmission load on the first and/or second transmission path. In some embodiments, the enhanced DCU provides for more than one type of network connection and, in some instances, can provide protocol translation where protocol information is available. In one embodiment, the enhanced DCU may be located on a gaming machine. Details of providing functions of a DCU on a gaming machine are described in commonly owned and co-pending U.S. patent application Ser. No. 09/595,798 by Brosnan et al., filed on Jun. 16, 2000, and entitled "Using a Gaming Machine as a Server," which is incorporated herein by reference in its entirety and for all purposes.

Figure 7:
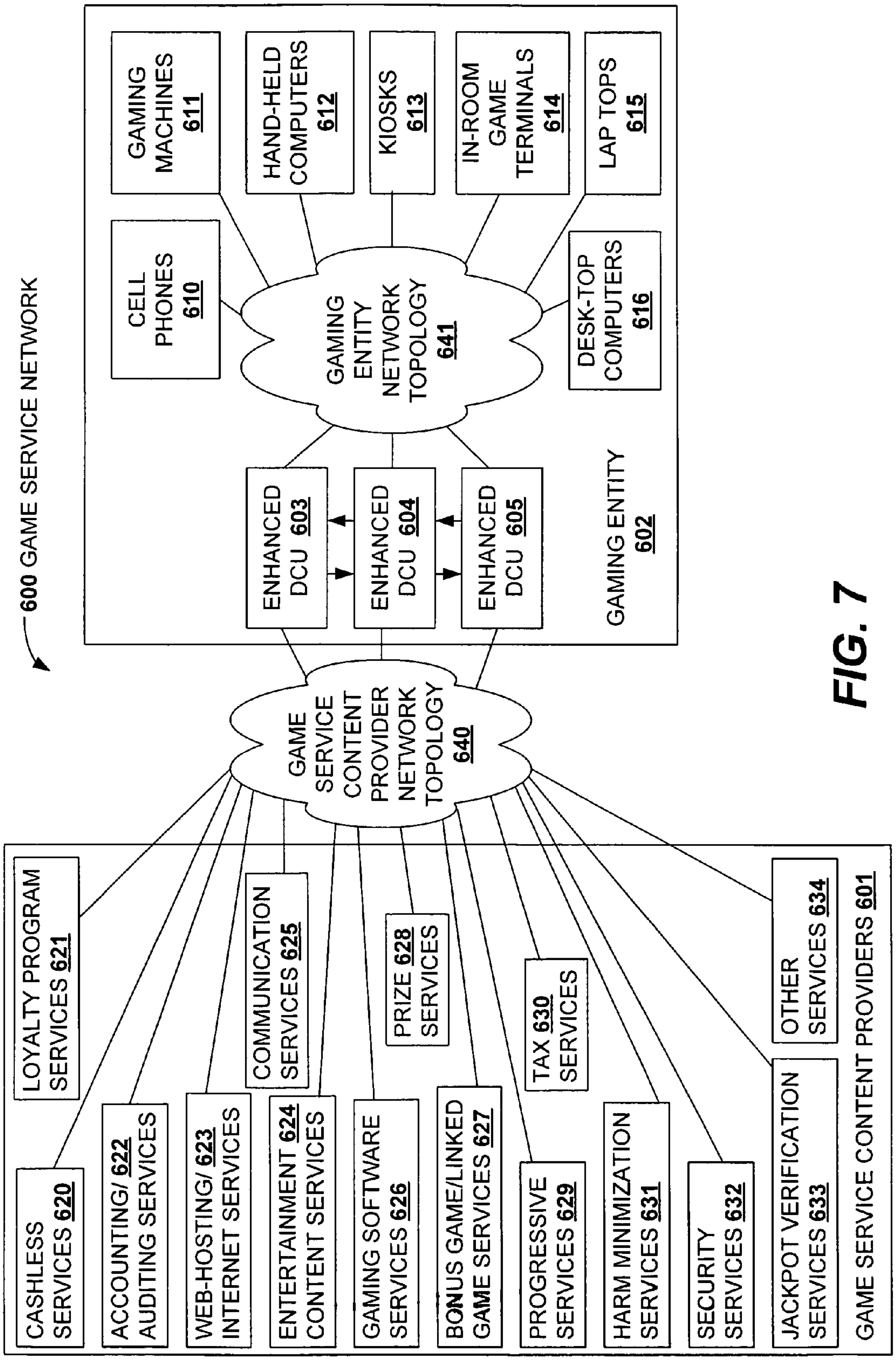
FIG. 7 illustrates a block diagram depicting an exemplary gaming service communication network using enhanced DCUs according to one embodiment of the present invention.

FIG. 7 is a block diagram of a WAN or gaming service network 600 using enhanced DCUs, 603, 604, 605 according to the present invention. The LAN or gaming entity 602 may comprise a number of gaming locations, such as casinos, hotels, satellite offices and other venues that provide game services, that are connected by a gaming entity network topology 641. It will be readily appreciated that the entire game service network 600 can be though of as a WAN, at least to the extent that it includes one or more of the remotely administered game service content providers 601. Similarly, gaming entity 602 can be considered a LAN, at least to the extent that most all items within gaming entity 602 contain at least one component that is local within a given location or at least a given casino or gaming establishment.

Gaming entity network topology 641 may be heterogeneous combinations of different communication architectures using various communication protocols and associated hardware. The topology 641 may include long distance wireless communication connections using cellular communication standards or local wireless communication connections a wireless standards, such as IrDA, Wi-Fi (802.1x) and Bluetooth™. The topology 641 may include wired communication connections and standards such as Ethernet communication connections, co-axial cable communication connections, fiber-optic communication connections and regular wired phone connections. Communication standards and protocols and their associated hardware that may be used in the present invention and supported by the enhanced DCU include but are not limited to TCP/IP, USB, Firewire, RS-232, RS-485, IEEE1394, Bluetooth, IEEE 802.11a, IEEE 802.11b, IEEE 802.11x (e.g. other IEEE 802.11 standards), hiperlan/2, and HomeRF, among others.

The gaming entity network topology may link a number of different devices that may be supported within the gaming entity. The devices include but are not limited to cell phones 610, gaming machines 611, hand-held computers (e.g., personal digital assistants) 612, kiosks 613, in-room game terminals 614, lap-top computers 615, desk-top computers 616, player tracking units (not shown) and smart cards (not shown), among others. The gaming machines 611 may be used to play games of chance such as, but not limited to, slot games and card games. The devices may be used by patrons of the gaming entity, such as a patron using a gaming machine to play a game of chance, as well as employees of the gaming entity. For example, employees of the gaming entity, such as casino management, may utilize numerous devices such as cell phones, hand-held computers and laptop computers that may be connected to the network topology 641.

The devices within the LAN or gaming entity 602 may receive gaming information and gaming services from a number of different gaming services content providers 601 including, but not limited to, cashless services 620, loyalty program services 621, auditing/accounting services 622, web-hosting/internet services 623, entertainment content services 624, communication services 625, gaming software services 626, bonus game/linked game services 627, prize services 628, progressive game services 629, tax services 630, harm minimization services 631, security services 632, jackpot verification services 633 and other services 634. Cashless services 620 may include services and information related to the validation of cashless instruments, such as printed tickets, and electronic fund transfers that are used within the gaming entity or a combination of gaming entities. Cashless services 620 might also include a network or system related to player storage or debit cards and associated accounts, as noted above. Where both of such cashless services are included within the same overall network, that is to say, both cashless instrument services and player storage card and account services, such services are likely provided by two separate and disparate systems. Accordingly, "cashless services" 620 can represent multiple disparate systems even within the same item. It is similarly contemplated that all such service items 620-634 within game service content providers 601 may include multiple disparate gaming systems within each such service item. Other examples could include multiple disparate systems to account for the different applications of Class II games and Class III games with respect to at least loyalty program services 621, accounting/auditing services 622 and tax services 630, among other possibilities.

Loyalty program services 621 may include services and information related to the accumulation of player tracking points and the validation of player tracking points for services and prizes. Auditing/accounting services may include services and information relating to tracking the performance of different gaming activities, such as game play on gaming machines, within the gaming entity 602. Web-hosting/Internet services may include services and information provided via the web or the Internet. Entertainment content services 624 may include information and services related to streaming video feeds and audio feeds to a device such as the gaming machine 611. For example, live sporting events are one type of video feed that may be provided. Communications services 625 may include information and services related to peer-to-peer communications between various devices in the gaming entity 602 and outside of the gaming entity, such as text messaging, voice communications, video feeds, e-mail, paging and locator services.

Gaming software services 626 may include downloading software to gaming machines 611 and other devices within the gaming communication network. For instance, a game server may provide gaming software and gaming licenses used to play different games of chance on the gaming machines 611. Further, the game server may be used to provide software upgrades and "bug" fixes for the gaming machines 611. In addition, the gaming software service may include the remote configuration of a gaming device such as one found within gaming machines 612 or those casino kiosks 613 with a set of gaming software. The bonus game/linked game services 627 may include providing linked bonus games and tournament games to the gaming machines 611. The prize services may include providing combinations of cash and non-cash prizes for awards on the gaming machines 611 and methods for redeeming the non-cash prizes. The progressive game services 629 may be related to providing progressive jackpots for games of chance played within the gaming entity. Details of non-cash prize methods and game services that may be used with the present invention are described in commonly owned U.S. Pat. No. 6,857,959, by Nguyen, entitled "Name Your Prize Game Playing Methodology," which is incorporated herein by reference in its entirety and for all purposes.

Tax services 630 may include separate accounting or tracking systems that track the tax implications of various games played, player tracking points awarded and other transactions on various gaming devices. Since tax implications can vary depending upon a particular application, tax services 630 is another particular example of a game service content provider 601 that might be made up of multiple disparate gaming systems. For example, tax services 630 might include one tax accounting system that tracks transactions for all Class II gaming devices within a gaming establishment, and another separate tax accounting system that tracks transactions for all Class III gaming devices within that same gaming establishment. Similar separate systems might apply for loyalty program services 621 and accounting/auditing services 622 too, as noted. Harm minimization services 631 can include one or more systems adapted to control and limit the play of players according to jurisdictional requirements, voluntary limits imposed by the individual gaming establishment, or both. Such services may be voluntary, but more typically will be mandatory, and are typically administered by use of a specific player identifier, which can be a universal indicia of identification, as explained in greater detail below. Other details of harm minimization, as well as additional ways of verifying and/or identifying players at remote gaming terminals generally, are described in commonly owned and co-pending U.S. patent application Ser. No. 10/708,168 by Nguyen et al., filed on Feb. 12, 2004, and entitled "Player Verification System and Method for Remote Gaming Terminals," which is incorporated herein by reference in its entirety and for all purposes.

Security services 632 may include services generally provided by one or more sophisticated security systems within a casino or other gaming establishment, such as a camera network and related central surveillance room. Such systems are known to include databases of files for tracked individuals, particularly known or suspected cheats or thieves, as well as blacklisted players and other persons of note. Such files can include personal identifying information on such players, as well as photos and/or video clips. Further details regarding possible implementations of such security systems are described in commonly owned and co-pending U.S. patent application Ser. No. 10/622,392 by Kiely et al., filed on Jul. 17, 2003, and entitled "Security Camera Interface," which is incorporated herein by reference in its entirety and for all purposes. It is also specifically contemplated that any other type of security system used in and associated with a gaming environment may also be similarly used in connection with the present invention. Jackpot verification services 633 can include services associated with the notification and verification of jackpots, including progressive jackpots. As is generally known in the art, such services can become particularly useful with respect to large jackpots that must be verified by an outside source or authority, and as such may be relegated to a separate gaming system. Other services 634 can include any and all other gaming related services that could be offered or provided in conjunction with WAN or game service network 600. It will be appreciated that any presently available or future developed gaming related system could be included in this category of other services 634.

The gaming entity 602 is connected to the game service content providers 601 via the game service content provider network 640. The game service content provider network 640 topology may use combinations of wired and wireless network architectures as described with respect to the gaming entity network topology 641. The game service content providers 601 may be a different entity from the gaming entity 602 or part of the gaming entity 602. For instance, the gaming entity 602 may not generate its own gaming software and the gaming software services 626 may be provided by a number of companies outside of the gaming entity 602 that are in communication with the gaming entity 602. In contrast, the auditing/accounting services 622 may be provided by the gaming entity 602. When game service content is provided by the gaming entity 602, the gaming service content provider, such as auditing accounting service provider 622, may be directly connected to the gaming entity network topology 641.

The game services content providers 601 and the gaming devices within the gaming entity 602 may communicate with one another using services provided by the enhanced DCUs, 603, 604, 605. These enhanced DCUs may be designed to facilitate the provision of any combination of a variety of services and system mediations. First, as previously described with respect to FIGS. 3, 4 and 5, the enhanced DCUs may provide a secondary or back-up communication path for communications between two gaming devices, two game service content providers or between a game service content provider. The back-up communication path may be provided when a primary communication path is lost or too busy. The enhanced DCUs may also monitor network traffic to perform load balancing. The enhanced DCUs may be connected to one another to perform the load balancing functions as a group by communicating with one another. Further, by connecting the DCUs together, additional communication redundancy may be added. As will be readily appreciated, redundant communication paths may be provided within a single enhanced DCU, within a plurality of physically separate enhanced DCUs, or in some combination thereof.

The enhanced DCUs may adapted to perform and/or facilitate a number of network mediation tasks, particularly in conjunction with one or more specialized player identification devices. Such network mediations provided or facilitated by one or more enhanced DCUs and/or player identification devices can collectively be called "service mediation," with such a general service mediation including protocol mediation, hardware mediation, eligibility mediation, or any combination thereof. First, an enhanced DCU may convert data signal format to another data signal format, such as converting from an RS-232 standard to an RS-485 format, or by converting between the RS-485 format to a fiber optic communication format. The data signal conversion may involve changing a physical characteristic of the signal such as a voltage level. In a second mediation task, the enhanced DCUs may perform protocol conversion. As described above, different manufacturers of gaming devices may utilize different proprietary communication protocols or non-proprietary protocols to communicate gaming information. For instance, a gaming machine manufactured by IGT may use an SAS protocol, while a slot accounting server manufactured by Bally's gaming systems may use an SDS protocol. Therefore, for communication between a gaming machine using SAS and a server using SDS, the enhanced DCU may translate between SAS and SDS.

In a third meditation task, as described with respect to FIG. 4, the enhanced DCU may provide encryption and decryption services. For instance, the enhanced DCU may store 1) a private encryption key that may be used to decrypt information encrypted with a public key and 2) public keys from a number of other gaming devices. The enhanced DCU may use the keys to encrypt and decrypt data and validate the identity of a data sender. Further, the enhanced DCUs may generate symmetric encryption keys used to encrypt large data files. The enhanced DCUs may perform a number data caching tasks. For example, files downloaded, such as software or multimedia content, from a game service content provider and sent to a gaming device, such as gaming machine, may cached on the DCU prior to being sent to the gaming device. The data caching may prevent an interruption of game services provided on the target gaming device caused from a large data download. Further, the data caching may be used to reduce network traffic and improve network performance. For instance, to reduce network traffic, frequently requested data may be cached on the enhanced DCUs. A data cache may also provide a data buffer when a connection has been lost or while waiting to make a data uplink connection with another gaming device.

The enhanced DCUs may also be used to perform a number of data transcoding tasks. Transcoding is a process of transforming the format and representation of content. With transcoding, game service content may be filtered, transformed, converted and reformatted to make it universally accessible to a plurality of different gaming devices with different capabilities. In the transcoding process, game service content may be tailored "on the fly" by the enhanced DCU to the capabilities of a target device. An advantage of "just-in-time" transcoding is that it reduces the need to maintain multiple versions of data or applications for multiple device types. A transcoder service may include a basic set of content transformations or transcoders and/or a centralized control of user profiles and preferences for intelligent content modification for targeted devices and a developer tool kit of adding custom transformations. The transcoder service may include content analyzers used to determine the type and purpose of game content. For example, a content analyzer may determine a format for an image and whether it is used for a navigational button or related to textual content. The user profiles may be used to determine how the game service content is transformed for a particular device and/or user. Therefore, not only device capabilities but also user preferences may be considered in the transcoding process. In general, content may be transformed according to authoring intention (e.g., the content itself may specify how it is to be transformed), device constraints, and policies administered by the server/proxy.

Various examples of common transcoding tasks may include, but are not limited to: 1) performing language translation, such as converting between different mark-up languages, 2) performing text formatting, such as converting tables to bulleted lists, 3) removing features not supported by a target gaming device, such as Javascript™ applets or Shockwave™ files, 4) converting text to a font supported by the device, 5) performing data compression and data scaling to speed transmission, 6) converting between image formats, 7) converting between application formats, 8) speech recognition and 9) text to speech/speech to text conversion. For example, images in a format such as GIF or JPEG may be reduced in scale or color level to speed up transmission and rendering of the images. Further, one image format may be converted to another image format. Communication protocol translations as previously described above may be considered an example of a transcoding service.

Transcoding may be useful because the gaming devices connected to the gaming entity network 641 may share common content sources and perform similar tasks. For example, a game service content provider, such as a game server, may provide a game of chance that is played on the hand-held computer 612, the cell phone 610, the gaming machine 611, the in-room gaming terminal 614 and the desk-top computer 616. To provide the game of chance, the game server may send multimedia content to these devices. The enhanced DCU may analyze: 1) the game content provided by the game service content provider, 2) the capabilities of the target device, and/or 3) any restrictions on the game content. After performing the analysis, the enhanced DCU may transform the game data to a format that is optimized for the capabilities of the target device and that satisfies any restrictions that have been imposed, such as restrictions designed to satisfy gaming regulations.

In the present invention, the enhanced DCUs 603, 604, 605 may be used in a peer-to-peer network where the gaming devices, including but not limited to other DCUs, cell phones 610, gaming machines 611, hand-held computers, kiosks 613, in-room game terminals 614, lap-tops 615 and desk-top controllers 616 and host servers, may share and swap information and applications. To enable peer-to-peer information and application sharing, the enhanced DCUs 603, 604, 605 may generate and regularly update directories listing information and applications stored on gaming devices connected to the gaming communication network, such as gaming software available for downloading from one gaming device to another. The enhanced DCUs 603, 604, 605 may also track what devices are currently connected to the gaming communication network. In addition, as described with respect to FIG. 4, these enhanced DCUs may perform various access control functions such as, but not limited to, determining that gaming devices connected to the gaming communication network are authorized to be on the network, and determining when transactions between two gaming devices are authorized, such as, but not limited to, requests for applications, information and gaming services.

Single Login For Players

In general, the foregoing devices and systems can be utilized to benefit both gaming operators and players in creating and using specialized gaming machines and systems that are adapted to permit communications and activities across multiple disparate gaming systems within a single gaming environment. As detailed above, this is preferably accomplished by utilizing a plurality of enhanced DCUs that are adapted to provide or at least facilitate one or more forms of service mediation, which can include: 1) protocol mediation, 2) hardware mediation, 3) eligibility mediation, and/or 4) redundant communication links for uninterrupted service between the LAN and the overall WAN. It is also preferable that these enhanced DCUs operate in conjunction with card readers or other player identification devices at the various gaming machines and devices such that the provided systems also present: 5) a unified front end from the perspective of the player, such that only one login by the player is required to access some or all disparate systems associated with the gaming machine or device to be used by the player.

Such results are not only more efficient for the casino or other gaming operator, but present a more user friendly environment for players, whereby players are more likely to enjoy themselves more and return for future gaming sessions as a result. The end result of such provisions is the effective "stitching" together of a plurality of disparate systems or environments, at least at the LAN or "front end" of the system from the perspective of the player, such that there is at least a perception from such a front end that many or all such disparate systems operate as one unified overall network or system. Such a result is particularly useful, for example, in those gaming environments that provide both Class II and Class III games, as noted above. In fact, where appropriate "stitching" of multiple disparate systems takes place, even hybrid gaming machines or devices adapted to play Class II and Class III games can present many or all games and functions to a player after only a single login by the player at the gaming machine or device.

Although it may be possible to "stitch" together multiple disparate systems at the "back ends" of the systems, such as from server to server, such attempts can tend to be more costly and complicated when compared to doing so at various LANs or "front ends." For example, it was projected in one actual application that such an approach would require at least a dozen engineers dedicated to the cause for at least one year to achieve an appropriate level of intercommunications between a Class II gaming system and a disparate Class III gaming system for a single environment. Conversely, "stitching" together basic communications at the various front ends or LANs of an overall WAN can result in avoiding some of the complex forms of data interchanges and translations between back ends of disparate systems, while still permitting a single player initiated identification mechanism to serve the needs of multiple systems at the front ends.

This is preferably accomplished by providing each player with a single indicia of identification, and adjusting one or more components of the front ends or LANs of the overall WAN to format player identification data at the point of acceptance or elsewhere within the LAN for each specific back end system. In a preferred embodiment, this single indicia of identification can be used one time by a player in a single transaction at the gaming machine or device in order to log the player into all available systems and services for a gaming session at that gaming machine or device. Such a single indicia of identification can be any of a number of different items, from physical item to a more positive player identifier, such as a personal identification number ("PIN") or player biometric, such as a fingerprint, retinal scan, voiceprint, digitized personal signature or the like. Physical items could include, for example, a credit card, debit card, smart card, magnetic striped card, printed ticket, room key, keychain, bracelet, wristwatch, lucky token, portable wireless device, RFID tag, bar code, thermal print, infrared ink print, and/or electronic ink print, among others. Virtually any form of item could be used as part of or in conjunction with the single indicia of identification for the player, and various examples of such items that can be used to verify or identify a player are detailed in commonly owned and co-pending U.S. patent application Ser. No. 10/708,168 by Nguyen et al., filed on Feb. 12, 2004, entitled "Player Verification System and Method for Remote Gaming Terminals;" No. 10/897,822 by Benbrahim, filed on Jul. 22, 2004, entitled "Remote Gaming Eligibility and System Using RFID Tags;" and No. 10/923,568 by Griswold, et al., filed on Aug. 20, 2004, entitled "Gaming System with Rewritable Display Card and LCD Input Display for Reading Same," all of which are incorporated herein by reference in their entireties and for all purposes.

It is also contemplated that more than one thing be used as part of such a "universal indicia of identification," particularly where security is a concern. For example, in situations where access to EFT services are desired, it may become necessary for a player to present not only a universal card, but also a PIN or biometric identifier, such as a fingerprint. In such instances where multiple items can be combined as such to comprise the universal indicia of identification, it is preferable that all such items be presented in a single transaction at the same time or during a single concise time frame. In one particular application, for example, a smart card can be provided by a player into a card reader at a gaming device, whereupon the player must then enter a specific PIN soon thereafter to confirm that it is the proper player and in order to access all possible systems and services.

Under any suitable form or forms of universal identification indicia for player, initiation of a player identification sequence or single "transaction" by a player preferably enables simultaneous transmission of player identification data on all associated interfaces. This can be accomplished, for example, through use of a card reader or other such player identification device at the gaming machine and an associated enhanced DCU that is adapted to facilitate both protocol mediation and hardware mediation between the player identification device and the various back end systems. This allows multiple systems to immediately identify the user using a single identification sequence initiated by the player. Complex data exchange mechanisms at the system back end are then not required.

One embodiment of the invention utilizes a magnetic stripe reader mechanism with a microprocessor to acquire the data from the magnetic read head, format the data appropriately for each connected interface and also simultaneously transmit the formatted data through each interface. An enhanced DCU can be used as well to facilitate this function. At the electrical level, it is preferable that each interface be individually selectable from amongst an RS232 interface, an RS422 interface, an RS485 interface, a USB interface, an Ethernet interface, and the like, as noted above. At the software level, the enhanced DCU or other suitable device collects raw data such as a player ID, game information and the like, and formats it into messages according to the requirements of the various disparate application servers. Communications between the card reader or other player identification device or mechanism and the back end of any given system are preferably bidirectional. A back end system can send data format information to the player identification mechanism, which then uses this data format as a "template" to properly format the player identification data received from the player initiated identification action to then be sent to the appropriate back end system. The mechanism supports multiple formatting options, at least one per communication channel. Of course, an enhanced DCU could be interposed between the back end system and a more simplified card reader as appropriate.

In an alternative embodiment, multiple pre-formatted player identification data files are stored on the identification medium, such as a player tracking smart card or magnetic stripe card. When the player then initiates an identification event, such as inserting his or her card into a player tracking device at a gaming machine, then all of the pre-formatted identification files or information are read from the card or other medium and potentially acted upon at that time. Each such file or data set preferably includes a system identifier portion that would be used by the reading mechanism to route the information to the appropriate communication channel. Under such an alternative embodiment, it will be appreciated that the card or other item reading device should be a "smart" device capable of reading information in a number of different formats. For example, a smart card or mag stripe card reader located at the gaming machine or other gaming device could be an enhanced DCU. Again, further details of implementing a DCU at a gaming machine are provided in U.S. patent application Ser. No. 09/595,798, which has been incorporated by reference above.

In some embodiments, some of the various services and features offered from the disparate gaming systems can be mandatory, and are thus always provided within a given environment, while other such services and features can be optional, subsequent to selection by the player. Depending upon all services and features offered by a given system, entire gaming systems can similarly be mandatory or optional. Examples of systems that could be mandatory and are therefore always available can include systems with the actual game servers for Class II gaming or Class III gaming, some types of cashless systems, various accounting and tax systems, harm minimization systems and security systems, among others. Examples of systems that could be made optional and subject to player election can include, for example, cashless services such as printed tickets, various loyalty programs or player tracking systems, web-hosting and Internet services, and entertainment content services, among others.

Although it may be preferable to require a player to select which services or systems he or she desires at the time of login, it may also be possible to provide additional optional services at a later time. Accordingly, it would be appropriate under such an option to store data for the player regarding any and all such optional systems at the time of login, even those not selected at that time, such that these non-selected services or systems could be made available later in the gaming session without requiring the player to re-login. In addition, the availability of some systems or services may be determined based on one or more particular eligibility factors. In this regard, eligibility mediation can be provided with respect to a given player, gaming machine, device. LAN or any combination thereof being eligible to receive access to one or more particular games, presentations, services or systems altogether. In some embodiments, eligibility mediation can be provided based upon programmed parameters within one or more systems, servers, enhanced DCUs and/or particular player identification devices, as will be readily appreciated.

Eligibility mediation can be based on a number of different factors and types of factors, such as player based and/or location based factors, among others. Where factors are based on the particular player, such factors might include, for example, age, gender, membership to one or more programs, clubs or organizations, and/or membership status within such programs, clubs or organizations, among others. As a particular illustrative example, where a collective system is adapted to track the status of players as possible members of Alcoholics Anonymous, recognized registered members would not be subject to any advertising service that involves ads for alcohol. As another particular example, only players registered in a given player rewards club having a particular status level or higher, such as, for example, a "Gold" status, may be eligible to receive certain promotions and specialized advertisements.

Further, the availability of one or more systems or services might also be determined based on the physical location of the player, gaming machine or device, or LAN, and the legal jurisdiction resulting therefrom, as may be appropriate. For example, lotto, powerball, or other lottery systems or services might be made available generally on a full WAN wide basis from a given lottery systems provider, such as the GTECH Corporation of West Greenwich, R.I. However, many states and jurisdictions, such as Nevada, for example, do not permit lotto or lottery type games or services. Accordingly, only the gaming machines, devices and LANs within appropriate states and jurisdictions across the WAN that permit such services would be eligible to provide them. In practice, the player identification device or other suitable component could be adapted to screen out such systems or services for locations where they would not be legal or appropriate.

Other exemplary applications of where systems or services might not be appropriate and thus screened out on an automatic basis can include advertising or licensing systems and services. In many situations, advertising and/or licensing may be paid for on a regional basis, such that prepaid ads may be run, or licensed products or services provided, in some areas or regions, but not others. For example, a given retail apparel chain might pay for a series of automated advertisements through an advertisement service to be used in conjunction with a gaming WAN such as that described above, although such payment is made only for ads to be run on the east coast, where the chain is based and focused. Accordingly, a service mediation providing player identification device or other suitable component associated with a gaming machine in Nevada could be adapted to recognize that it is not within the geographically defined appropriate area for such ads to be run, and thus block the running of such ads on its associated gaming machine in Nevada, particularly where such an ad might have been programmed to run on a WAN basis. As will be readily appreciated, an actual presentation to a player at the affected Nevada gaming machine might involve a substitute ad, an attract mode promotion, or blank space, among various alternatives. Similar applications with respect to regional licensing payments and issues for any particular system or service are also contemplated.

In some embodiments of the present invention, which can include any combination of features and items from one or more of the foregoing embodiments, players may be permitted to play anonymously, at least with respect to no true identity of the player being submitted. In such embodiments, the universal indicia of identification provided to players wishing to remain "anonymous" can be adapted to differentiate each such player from all other players, but it would not affirmatively provide or track the true identity of said player. Such a result could be obtained by, for example, allowing a player to register but only assigning that player a specific number, code or other form of generic non-personal differentiator that does not require an affirmative identification of the player.

Details of such a system for awarding player tracking points anonymously, as well as other various anonymous player tracking program features that may be used with the present invention, are described in commonly owned and co-pending U.S. patent application Ser. No. 09/927,742 by Kaminkow, filed Aug. 10, 2001, and entitled "Flexible Loyalty Points Programs," which is incorporated herein by reference in its entirety and for all purposes. Of course, such features and other details that apply to player tracking programs could also generally be applied to the single indicia of identification as disclosed herein and thus all available gaming systems and the various services provided thereby. Further, it may not be possible for some systems or services to be available under such an anonymous player approach, such as, for example, EFT or other credit sensitive systems that might require a positive identification for use. In such instances where a player wishes to register and play anonymously with an appropriate anonymous indicia of identification, it may become necessary to refuse the use of EFT and other similar systems to such a player.

Figure 8:
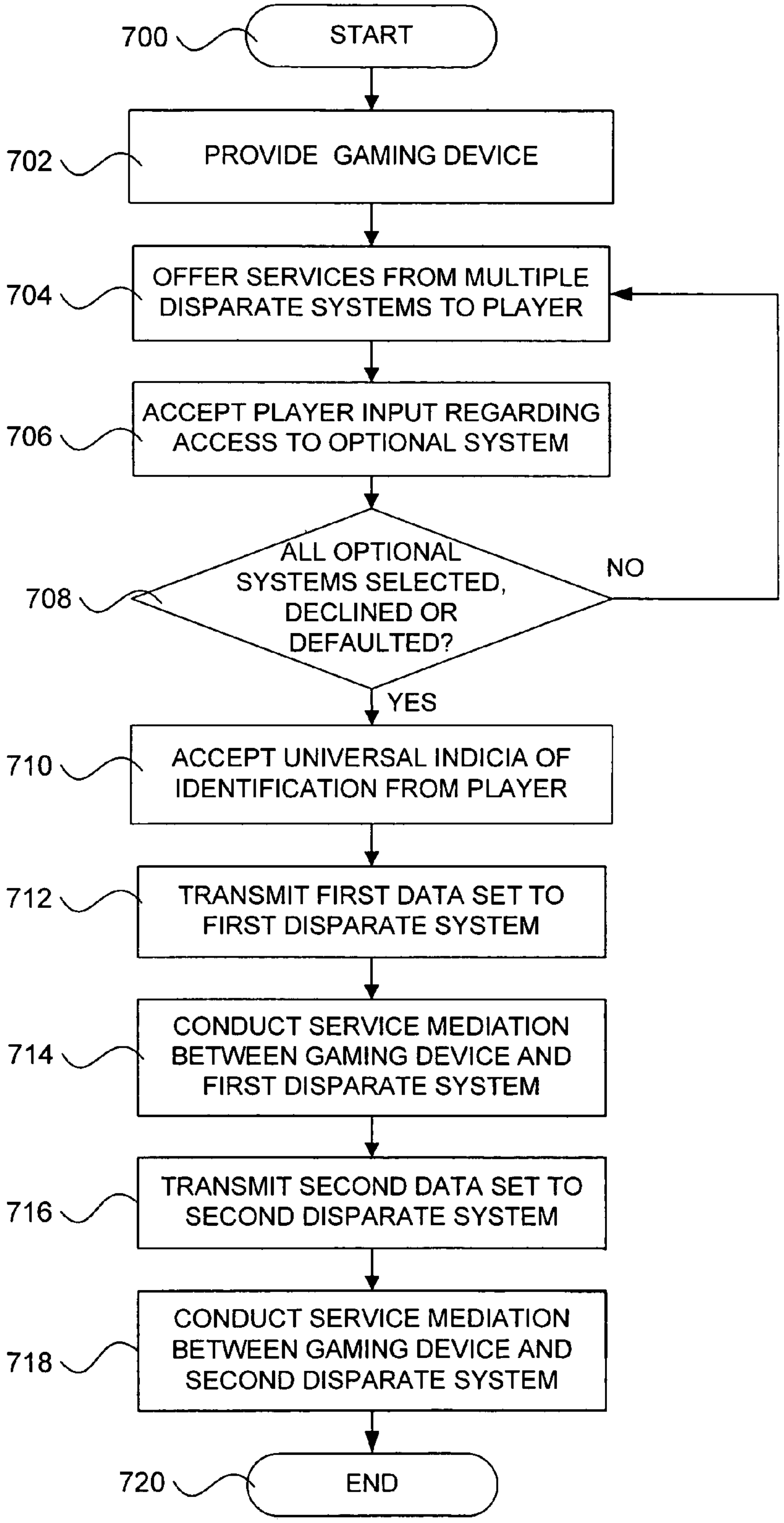
FIG. 8 illustrates a flow chart of one exemplary method of permitting a player to login to a plurality of disparate gaming systems through a single login action according to one embodiment of the present invention.

Referring lastly to FIG. 8, a flow chart of one exemplary method of permitting a player to login to a plurality of disparate gaming systems through a single login action according to one embodiment of the present invention is shown. While this flow chart may be comprehensive in some respects, it will be readily understood that not every step provided is necessary, that other steps might be included, and that the order of steps might be rearranged as desired by a given gaming operator or gaming machine or system manufacturer. After a start step 700, a gaming machine or other relevant gaming device is provided at a process step 702. While such a device can be a gaming machine, it will also be understood that such an item could also be any gaming device having an appropriate display that could be used at any other gaming location, such as at a table game, sports book, keno lounge, kiosk, in-room terminal, home computer, cell phone or other gaming location, among others.

At a following process step 704, services and features from multiple optional disparate gaming systems are offered to the player, after which player input regarding access to such optional systems is accepted at process step 706. An inquiry is then made at decision step 708 as to whether all optional systems having various services and features have been selected or declined by the player, or alternatively set by default. In the event that no affirmative input on a given optional system is provided by a player, a default setting can indicate whether or not the service is accepted or declined for purposes of that gaming session by the player. Such a default setting can be to decline access to the given optional system, or conversely can be to provide access, preferably with a notice or disclaimer to the player that such a system is being provided. If every optional system has not been decided upon either by the player or by default, then the method reverts back to process step 704. Once a decision has been made on all offered optional systems, however, then the method continues to process step 710, where a universal indicia of identification is accepted from the player. Such a universal indicia of identification can be any of a number of items or combination of items, and is preferably provided in a single transaction by the player, as noted above.

At process step 712, a first set of data regarding one or more activities of the player at the gaming device is transmitted to a first disparate gaming system, and preferably to a host of such a first system. Such a first data set preferably includes at least some data regarding the single transaction involving the provision of a universal indicia of identification by the player. At process step 714, service mediation between the gaming device and first disparate gaming system is performed, which service mediation can include protocol mediation, hardware mediation, eligibility mediation, or any combination thereof. Again, such mediations can be performed at a number of locations, but are preferably performed at the front end of the overall wide area network, such as at the gaming device itself, or at a nearby enhanced DCU, as explained in greater detail above. Of course, such mediations may also be performed with respect to other disparate gaming systems, as needed or desired.

At process step 716, a second set of data regarding one or more activities of the player at the gaming device is transmitted to a second disparate gaming system, and preferably to a host of this second system. As in step 712 above, this second data set also preferably includes at least some data regarding the single transaction involving the provision of a universal indicia of identification by the player. At process step 718, service mediation between the gaming device and second disparate gaming system is performed, and similar to step 714 above, such service mediation can include protocol mediation, hardware mediation, eligibility mediation, or any combination thereof. The method then ends at an end step 720. Of course, additional transmissions of data to the first and second disparate gaming systems may also take place before, during or after the particular gaming session by the player, and similar data transmissions and service mediations may also be made to a third, fourth, and/or any of a number of additional disparate gaming systems in this same time frame, as will be readily appreciated. Again, the various disparate gaming systems that could be so involved are numerous, and several specific examples of the types of systems that could be made available are provided above, such as at FIG. 7.

Although the foregoing invention has been described in detail by way of illustration and example for purposes of clarity and understanding, it will be recognized that the above described invention may be embodied in numerous other specific variations and embodiments without departing from the spirit or essential characteristics of the invention. Certain changes and modifications may be practiced, and it is understood that the invention is not to be limited by the foregoing details, but rather is to be defined by the scope of the appended claims. For instance, while the gaming machines of this invention have been depicted as having a top box mounted on top of the main gaming machine cabinet, the use of gaming devices in accordance with this invention is not so limited. For example, a gaming machine may be provided without a top box, or may have additional boxes or devices attached, or may be configured in bar tops, tabletops, or other structures. Further, the location of the signature input devices on the gaming machine may vary widely in different embodiments, thus, the examples described herein are not intended to be limiting of the present invention. Additionally, the gaming communication network may be connected to other devices including other servers or gaming devices over the Internet or through other wired and wireless systems.

What is claimed is:

1. A gaming machine configured for accepting a wager, playing a game based on the wager and granting a payout based on the result of the game, comprising:

an exterior housing arranged to contain a plurality of internal gaming machine components therein;

a master gaming controller in communication with at least one of said plurality of internal gaming machine components and configured to control one or more aspects of said game;

at least one link configured to connect said gaming machine to a plurality of disparate gaming systems or at least one gateway thereto, said at least one link permitting data to be transmitted between said gaming machine and each of said plurality of disparate gaming systems, a gaming system of the plurality of disparate gaming systems configured to provide services to the gaming machine selected from the group consisting of cashless services, loyalty program services, auditing/accounting services, web-hosting/internet services, entertainment content services, communication services, gaming software services, bonus game/linked game services, prize services, progressive game services, tax services, harm minimization services, security services, and jackpot verification services; and a player identification device in communication with said master gaming controller and said at least one link, located within, about or in proximity to said exterior housing and configured to accept a universal indicia of identification from a player, wherein said player identification device is configured to:

facilitate protocol mediation between said gaming machine and the software of each of said plurality of disparate gaming systems, facilitate hardware mediation between said gaming machine and the hardware of each of said plurality of disparate gaming systems, facilitate eligibility mediation with respect to said player and to said gaming machine being eligible to receive one or more services from said plurality of disparate gaming systems, facilitate the ability of said player to log in to more than one of said plurality of disparate gaming systems for a gaming session at said gaming machine via a single transaction using said universal indicia of identification by said player, and allow access to only a subset of said plurality of disparate gaming systems for said player based on identification of said player, wherein at least a portion of said subset of disparate gaming systems available to said player is determined as a result of an affirmative selection of services or features by said player, wherein said subset is fewer than the entirety of said plurality of disparate gaming systems.

2. The gaming machine of claim 1, wherein said universal indicia of identification comprises at least one item belonging to or assigned to said player.

3. The gaming machine of claim 1, wherein at least a part of said universal indicia of identification is assigned to said player by the gaming establishment where said gaming machine is located.

4. The gaming machine of claim 1, wherein said universal indicia of identification comprises at least one item selected from the group consisting of: a credit card, a debit card, a smart card, a magnetic striped card, a printed ticket, a room key, a keychain, a bracelet, a wristwatch, a lucky token, a portable wireless device, an RFID tag, a bar code, a thermal print, an infrared ink print, an electronic ink print, a personal identification number, a fingerprint, a retinal scan, a voiceprint and a digitized personal signature.

5. The gaming machine of claim 1, wherein said link is configured to connect said gaming machine to said plurality of disparate gaming systems through a plurality of gateways thereto.

6. The gaming machine of claim 5, wherein at least two of said plurality of gateways comprise redundant gateway devices configured to connect a local area network including said gaming machine and a plurality of other gaming machines to a wide area network including one or more host servers for said plurality of disparate gaming systems.

7. The gaming machine of claim 6, wherein said redundant gateway devices comprise enhanced data collection units located at an interface between said local area network and said wide area network.

8. The gaming machine of claim 6, wherein said redundant gateway devices comprise a first gateway device connected to said player identification device via a first transmission path and a second gateway device connected to said player identification device via a second transmission path and to said first gateway device via a third transmission path.

9. The gaming machine of claim 1, wherein said single transaction using said universal indicia of identification by said player includes providing to said player identification device both an assigned object and a secondary personal identifier within the same approximate time frame.

10. The gaming machine of claim 9, wherein said secondary personal identifier is selected from the group consisting of: a personal identification number, a fingerprint, a retinal scan, a voiceprint and a digitized personal signature.

11. The gaming machine of claim 1, wherein said universal indicia of identification is configured to differentiate said player from all other players, but does not affirmatively provide the true identity of said player.

12. The gaming machine of claim 1, wherein said player identification device is configured to facilitate access to only a subset of services provided by said plurality of disparate gaming systems for said player, wherein said subset of services is fewer than the entirety of services provided by said plurality of disparate gaming systems.

13. The gaming machine of claim 12, wherein at least a portion of said subset of services available to said player is determined as a result of an affirmative selection of services or features by said player.

14. The gaming machine of claim 12, wherein at least a portion of said subset of services available to said player is determined based on the physical location of said gaming machine and the legal jurisdiction resulting therefrom.

15. The gaming machine of claim 12, wherein at least a portion of said subset of services available to said player is determined based on one or more particular eligibility factors of said player.

16. A gaming device configured for accepting a wager, playing a game based on the wager and granting a payout based on the result of the game, comprising:

a display arranged to present said game to a player of the gaming device;

at least one input device configured to accept an input from said player;

a master gaming controller in communication with said display and said at least one input device, and configured to control one or more aspects of said game;

at least one link configured to connect said gaming device to a plurality of disparate gaming systems and permitting data to be transmitted between said gaming device and each of said plurality of disparate gaming systems, a gaming system of the plurality of disparate gaming systems configured to provide services to the gaming machine selected from the group consisting of cashless services, loyalty program services, auditing/accounting services, web-hosting/internet services, entertainment content services, communication services, gaming software services, bonus game/linked game services, prize services, progressive game services, tax services, harm minimization services, security services, and jackpot verification services; and a player identification device in communication with said master gaming controller and said at least one link, located within, about or in proximity to said display or said at least one input device, and configured to accept a universal indicia of identification from said player, wherein said player identification device is configured to facilitate the ability of said player to log in to more than one of said plurality of disparate gaming systems for a gaming session at said gaming device via a single transaction using said universal indicia of identification by said player and to allow access to only a subset of said plurality of disparate gaming systems for said player based on identification of said player, wherein said subset is fewer than the entirety of said plurality of disparate gaming systems, wherein at least a portion of said subset of disparate gaming systems available to said player is determined as a result of an affirmative selection of services or features by said player.

17. The gaming device of claim 16, wherein said universal indicia of identification is configured to differentiate said player from all other players, but does not affirmatively provide the true identity of said player.

18. The gaming device of claim 16, wherein said player identification device is configured to facilitate service mediation between said gaming device and said plurality of disparate gaming systems.

19. The gaming device of claim 18, wherein said service mediation includes one or more components selected from the group consisting of protocol mediation, hardware mediation and eligibility mediation.

* * * * *